(12) United States Patent
Kumar et al.

(10) Patent No.: US 6,418,148 B1
(45) Date of Patent: Jul. 9, 2002

(54) BURST-LEVEL RESOURCE ALLOCATION IN CELLULAR SYSTEMS

(75) Inventors: Sarath Kumar, Eatontown; Sanjiv Nanda, Plainsboro; Stanislav Vitebskiy, Parsippany, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/121,149

(22) Filed: Jul. 23, 1998

Related U.S. Application Data

(60) Division of application No. 08/841,980, filed on Apr. 8, 1997, now Pat. No. 6,069,833, which is a continuation-in-part of application No. 08/539,476, filed on Oct. 5, 1995, now Pat. No. 5,734,646.

(51) Int. Cl.[7] .............................. H04J 3/16; H04J 3/22
(52) U.S. Cl. ...................... 370/468; 370/330; 370/444; 455/452; 455/509
(58) Field of Search .................... 370/468, 395, 370/332, 356, 335, 337, 347, 229, 339, 401, 443, 320, 329, 392, 231, 233, 349, 397, 426, 458, 431, 461, 402, 281, 330, 444; 455/408, 396, 38.2, 422, 507, 517, 524, 428, 509, 452; 340/825.03; 709/228, 229, 226, 250; 725/116

(56) References Cited

U.S. PATENT DOCUMENTS 5,583,869 A * 12/1996 Grube et al. ................ 370/347
5,677,905 A * 10/1997 Bigham et al. .............. 370/395
5,699,356 A * 12/1997 Beever et al. ............... 370/329
5,862,488 A * 1/1999 Kotzin et al. ................ 455/510
6,081,536 A * 6/2000 Gorsuch et al. ............. 370/468
6,115,390 A * 9/2000 Chuah ......................... 370/443

FOREIGN PATENT DOCUMENTS

| EP | 0 587 980 A | 3/1994 |
|----|-------------|--------|
| GB | 2 320 162 A | 6/1998 |
| WO | WO 96 37081 A | 11/1996 |

\* cited by examiner

*Primary Examiner*—David Vincent
*Assistant Examiner*—Bob A. Phunkulh
(74) *Attorney, Agent, or Firm*—Mendelsohn & Associates, PC

(57) ABSTRACT

Bursts of additional bandwidth (e.g., one or more supplemental channels or a channel having variable bandwidth) is assigned to users (e.g., high-speed data users) in a cellular telecommunication system. A request for assignment of additional bandwidth may be an initial request, a continuation request for an on-going burst, or a retry request after a previously rejected request. In any case it is determined whether to grant or reject the request. If the request is rejected, instructions are given to submit a retry request after a specified backoff time. The present invention may be implemented using either an asynchronous approach or a synchronous approach. According to the asynchronous approach, all requests are handled asynchronously. According to the synchronous approach, initial requests are handled asynchronously, but continuation requests and retry requests are handled synchronously at epoch times that coincide with specific time slots.

39 Claims, 14 Drawing Sheets

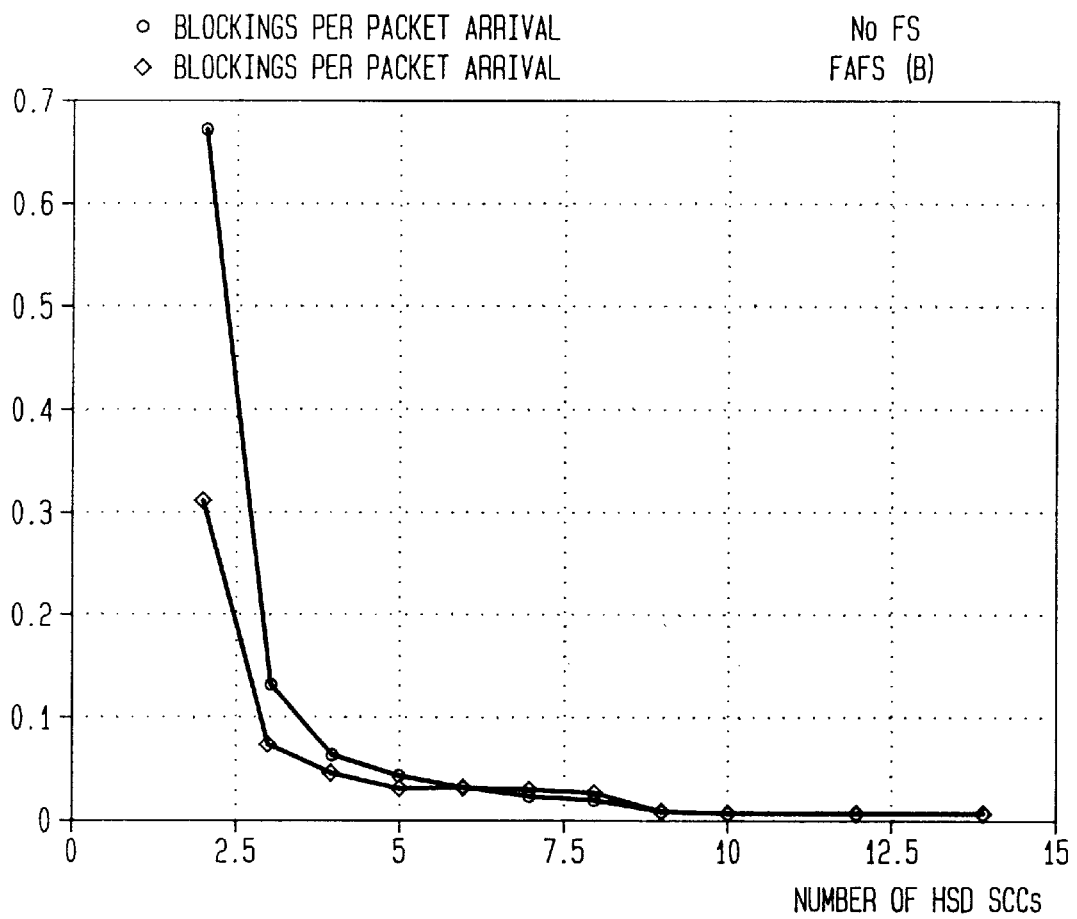

BURST-LEVEL RESOURCE ALLOCATION IN CELLULAR SYSTEMS

CROSS-REFERENCE TO RELATED APPLICATIONS

This is a continuation-in-part of application Ser. No. 08/841,980, filed on Apr. 8, 1997, and issued as U.S. Pat. No. 6,069,883 which is a continuation-in-part of application Ser. No. 08/539,476, filed on Oct. 5, 1995 and issued as U.S. Pat. No. 5,734,646.

BACKGROUND OF THE INVENTION

1. Field of the Invention

The present invention relates to telecommunications, and, in particular, to the allocation of bandwidth resources in a cellular system.

2. Description of the Related Art

A conventional cellular telephone system comprises a number of cell sites or base stations, geographically distributed to support transmission and receipt of voice-based communication signals to and from cellular telephones, often referred to as mobiles, although any given cellular telephone may actually be stationary. Each cell site handles voice communications over a particular region called a cell, and the overall coverage area for the cellular telephone system is defined by the union of cells for all of the cell sites, where the coverage areas for nearby cell sites overlap to some degree to ensure (if possible) contiguous communications coverage within the outer boundaries of the system's coverage area. One cell site may sometimes provide coverage for several sectors. In this specification, cells and sectors are referred to interchangeably.

When active, a mobile receives forward-link signals from and transmits reverse-link signals to (at least) one cell site. Each active mobile is assigned a forward-link channel on which it receives its forward-link signals and a reverse-link channel on which it transmits its reverse-link signals. There are many different schemes for defining channels for a cellular telephone system, including TDMA (time-division multiple access), FDMA (frequency-division multiple access), and CDMA (code-division multiple access) schemes. In CDMA communications, different channels are distinguished by different spreading sequences that are used to encode different voice-based streams, which may then be modulated at one or more different carrier frequencies for simultaneous transmission. A receiver can recover a particular voice-based stream from a received signal using the appropriate spreading sequence to decode the received signal.

In order to avoid interference between signals transmitted to and from mobiles in a cellular telephone system, all active mobiles within a particular cell are assigned different CDMA spreading sequences. Since cellular telephone systems are dynamic systems in which mobiles become active and inactive at different (and possibly random) times and since mobiles can move from one cell to another, the assignment of channels to the various mobiles is made by the cellular system in real time. In order to assign bandwidth resources to mobiles so as to avoid interference between mobiles in neighboring cells, the resource-assignment activities of neighboring cell sites may have to be coordinated.

In conventional cellular telephone systems, each mobile transmits and receives only voice-based communication signals. As such, each active mobile requires the assignment of only a single forward-link channel and a single reverse-link channel, where each channel in the system has the same fixed amount of bandwidth. For example, in the IS-95 family of CDMA-based communication standards, each channel in a system is either 9.6 kbps or 14.4 kbps, depending on which of two rate sets is implemented.

Future cellular telecommunication systems, however, such as those conforming to the IS-95B standard or wideband CDMA standards, such as the CDMA2000 and the WCDMA standards, or TDMA Packet Data standards currently being developed, will support mobiles that transmit and receive signals other than just voice-based signals. For example, a mobile data terminal may be designed to transmit and/or receive data streams. Such mobiles may require more bandwidth than is available in a single CDMA channel. Moreover, unlike voice-based streams, which are typically continuous streams with fairly uniform bit rates, data streams are typically bursty streams consisting of packets of data transmitted intermittently. As such, the bandwidth requirements for a mobile transmitting and/or receiving data (as opposed to voice only) will vary over time. The conventional schemes for assigning individual channels to mobiles for the durations of their active periods will typically not satisfy the requirements of a cellular telecommunication system that supports the transmission and receipt of bursts of data to and from mobiles.

SUMMARY OF THE INVENTION

The present invention is directed to a scheme for assigning additional bandwidth in a cellular telecommunication system that supports the transmission and receipt of bursts of data to and from mobiles. Such a scheme may be referred to as a burst admission control scheme, since it controls the admission of bursts to or from mobiles currently supported by a cell site for data transmission.

Depending on the system, the additional bandwidth may take different forms, such as one or more supplemental channels or a single channel having a variable bandwidth. In general, in this application, unless otherwise clear from the context, whenever one or more supplemental channels are referred to, it will be understood to refer to systems that can allocate multiple supplemental channels as well as systems that allocate variable bandwidth of a single channel.

The IS-95B standard, for example, provides the air-interface messaging structure to provide high data rate service. Similar procedures and messages are being written into data standards for TDMA and wideband CDMA. Efficient burst admission control schemes and procedures are needed to operate the service utilizing these messages and to optimize the spectral and network resource usage. The burst admission control schemes of the present invention take into account the following components: (i) procedures to estimate the available radio resources based on the measurements by the mobile and the cell site, and (ii) procedures to allocate the available resources to multiple data users accounting for fairness and efficiency.

In one embodiment, the present invention is a method for assigning additional bandwidth in a cellular telecommunication system, comprising the steps of (a) receiving an initial request for assignment of additional bandwidth for a user and determining whether to grant or reject the initial request, such that, if the initial request is rejected, instructions are given to submit a retry request after a back-off time; (b) receiving a continuation request for reassignment of additional bandwidth for an ongoing burst and determining whether to grant or reject the continuation request, such that, if the continuation request is rejected, instructions are given to submit a retry request after a back-off time; and (c) receiving a retry request for assignment of additional bandwidth after a previous request was rejected and determining whether to grant or reject the retry request, such that, if the retry request is rejected, instructions are given to submit a retry request after a back-off time.

BRIEF DESCRIPTION OF THE DRAWINGS

Other aspects, features, and advantages of the present invention will become more fully apparent m from the following detailed description, the appended claims, and the accompanying drawings in which:

FIGS. 12(A)–(B), 13, 14(A)–(B), 15(A)–(B), and 16 show simulation results for the present invention.

DETAILED DESCRIPTION

The IS-95B standard specifies that a mobile using high data rate packet service maintain connection to a cell site via one fundamental code channel at a data rate of 9.6 kbps or 14.4 kbps. Higher bandwidths are allocated to this mobile by assigning one or more supplemental code channels on a demand basis. Each of the supplemental channels supports at a data rate of 9.6 kbps or 14.4 kbps. The burst control function collates the burst requests from multiple connections and assigns the available bandwidth to different nodes using a burst admission control scheme. The term "burst control function" collectively refers to the processing elements that perform the burst admission control scheme. Depending on the implementation, the burst control function may be implemented at a central location in the cellular system, or it may be a distributed function, parts of which are implemented at various locations (e.g., the cell sites) throughout the cellular system.

As used in this specification, the terms "node" and "user" are used interchangeably and refer to a mobile data user for reverse-link communications and a mobile data user proxy for forward-link communications. Since supplemental channels are requested specifically for either the reverse link or the forward link, two instances of the burst control function are implemented independently: once for forward-link communications and once for reverse-link communications. The terms "node" and "user" refer to a mobile data user for the reverse-link burst control function and to a mobile data user proxy for the forward-link burst control function.

Figure 1:
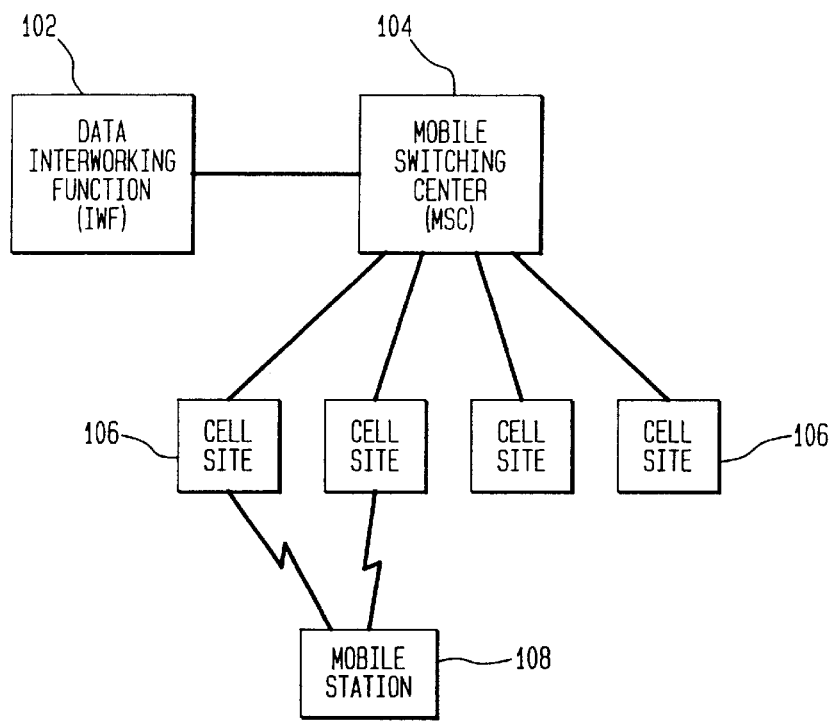
FIG. 1 shows a block diagram of a portion of a cellular telecommunication system, according to one embodiment of the present invention.

FIG. 1 shows a block diagram of a portion of a cellular telecommunication system, according to one embodiment of the present invention. Data interworking function (IWF) 102 provides the interface between the cellular network and packet data networks, such as the Internet. The cellular system infrastructure comprises a set of interconnected mobile switching centers (MSCs) 104, each supporting a number of cell sites 106. Data-service-capable mobiles 108 communicate with packet data networks by establishing cellular connections with the MSC through one or more cell sites. The procedures for establishing cellular connections over the RF interface and the wired infrastructure to the MSC are specified in standards, e.g., IS-95 (CDMA), IS-136 (TDMA), and GSM. In addition, for data services, a link layer connection is established between each active data mobile and the IWF. The link layer connection uses a cellular connection over the cellular infrastructure.

Figure 2:
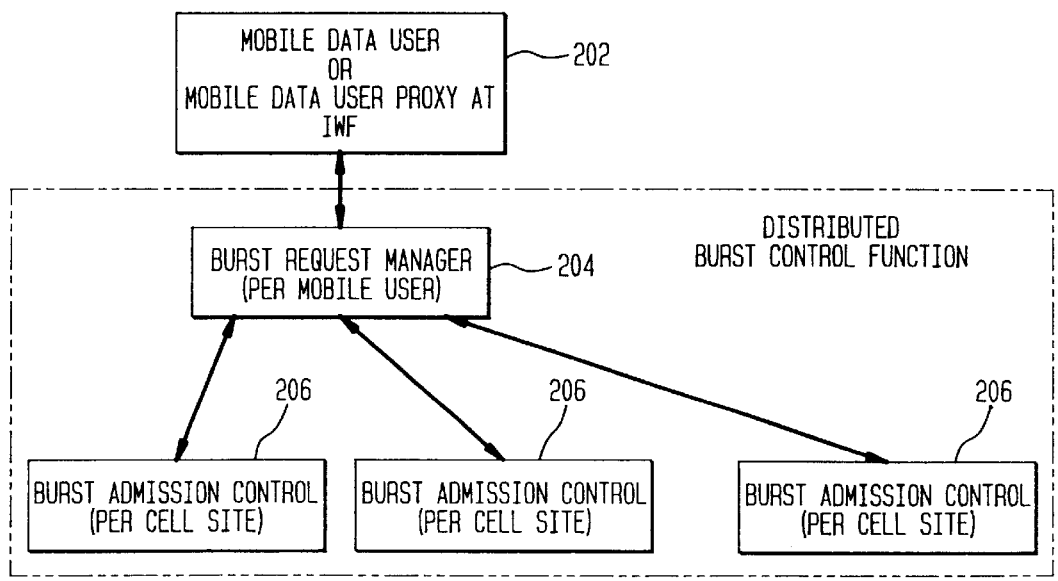
FIG. 2 shows a block diagram of a distributed burst control function for the cellular system of Fig. 1.

FIG. 2 shows a block diagram of a burst control function for the cellular system of FIG. 1, according to one embodiment of the present invention. The burst control function (BCF) has two main logical entities: the burst admission control (BAC) function and the burst request manager (BRM) function. The BAC function is responsible for assignments and resource usage at a given cell. The Burst Request Manager (BRM) is responsible for coordinating the resources allocated at different cell sites. This coordination is important for a CDMA system supporting soft-handoff for the supplemental channels, and is discussed in detail later.

The BCF could be implemented in a centralized or distributed architecture. In a centralized implementation, the BCF is located at a central location, for example, at the switch (MSC). In this case, the load and resource information from each of the cells is sent periodically or on a request basis to the BCF. This centralized architecture facilitates global optimization of the resources. In a distributed architecture, the BACs are located at the cell sites. Each of the BACs makes local allocation and communicates these allocations to the BRM, which coordinates the final allocations. The distributed architecture permits simple implementation and minimizes the data exchange between the MSC and cell sites.

The link layer end point on the IWF corresponding to a particular mobile is referred to as the mobile data user proxy 202. When the data backlog builds up in the mobile-to-network direction at the mobile or in the network-to-mobile direction at the mobile data user proxy on the IWF, this triggers a request for additional bandwidth to the cellular infrastructure. This request is handled by the burst control function in the cellular infrastructure.

According to the present invention, the burst control function is implemented in a distributed manner or a centralized manner. A user-specific burst request manager (BRM) 204 is allocated for each active data user. The BRM may be implemented either at the MSC (or one of its components, e.g. a base station controller, selection and distribution unit), or at one of the cell sites through which the mobile's cellular connection is currently active.

For systems supporting soft handoff, the mobile's cellular connection may consist of multiple diverse paths between the mobile and the MSC. Soft handoff refers to the process of transferring support for communications with a mobile from one cell site to another, where, at least for some period of time, the mobile simultaneously communicates with two or more different cell sites. Typically, these diverse paths traverse the RF interface to multiple cell sites, or multiple sectors of the same cell site. When such a mobile or its proxy at the IWF requires additional bandwidth resources on the cellular link, the BRM forwards the request to all of the cell sites where the mobile would require resources to be allocated. The set of cell sites at which additional bandwidth resources are to be allocated may be a subset of the cell sites with which the mobile is in soft handoff using the fundamental channel. The BRM forwards these additional bandwidth requests to the burst admission controllers (BAC) 206 for each cell site. In one embodiment, resources must be allocated at all of the requested cell sites for the request to be satisfied.

The BAC at each cell site receives requests from the BRMs corresponding to many different users. The BAC can measure the current resource utilization at the cell site. In this case, the resource may consist of channel hardware, available transmit power budget, or available receive power or interference budget. Mobiles may also be required to report pilot and channel quality measurements to the system. In addition, measurements and resource usage at neighbor cell sites may be shared between the BACs at each cell site. Using all these measurements, reports, and power and interference constraints, the BAC can determine possible allocation of resources to requesting BRMs.

Alternate resource allocation procedures are possible, where the BRM uses pilot strength measurements reported by the mobile to determine if it is possible to allocate resources for the mobile at precisely one cell or sector. This is referred to as the simplex burst mode. In a simplex burst mode, supplemental channels are assigned to a user at only one cell site and the BRM determines the one BAC that is to allocate resources to the mobile and forwards the mobile's burst request to that BAC. A mobile in simplex burst mode can be in soft handoff, but that soft handoff only applies to fundamental channels, not supplemental channels, which, in simplex burst mode, are allocated by only one cell site at a time.

The burst control function also accounts for fairness and efficiency in the resource allocation. The procedures to be used at each mobile's BRM and each cell site's BAC to ensure efficient and fair use of resources are described in further detail later in this specification. Using the resource allocation constraints and the fairness and efficiency criteria, each BAC reports the allocation back to the BRMs. Each BRM collates the responses received from the BACs to which it sent requests. The mobile is assigned the minimum of the bandwidth resources that are allocated to it by all the BACs to which it sent requests. This collation step is greatly simplified or eliminated through the introduction of the simplex burst mode.

Additional efficiency in allocation is enabled in some special cases when the BRM is co-resident with the simplex burst mode BAC. This is referred to below as local reassignment to simplex burst mode. Finally, note that in systems that do not support soft handoff, e.g., the current TDMA standards IS-136 and GSM, mobiles have a single leg (i.e., communicate with only a single cell site) and burst allocation is made in the simplex burst mode. The simplex burst mode procedures of the present invention are applicable to burst-mode in these systems as well.

According to the IS-95B standard, a node may request the temporary assignment of up to seven supplemental channels to achieve higher transmission rates. The duration of such a burst of supplemental channels is determined by the burst control function. The maximum number of supplemental channels and the duration that may be allocated for a burst at any time depends on the availability of radio resources, the transmit power, the set of RF path losses between the mobile and cell sites, and the number of contending data users. If, at the end of a burst, a node still has data backlogged, it may request burst continuation (i.e., a reassignment of supplemental channels). It may be preferable to limit burst continuation in order to facilitate fair sharing of resources among multiple nodes, safeguard from power and interference overload, and reduce packet delay and blocking. The available RF resources and the individual needs will change dynamically in this environment. The present invention addresses resource sharing in such a dynamically changing situation. Data users with different priority levels and different quality of service (QOS) requirements may be handled at the BAC differently. They may be given priority in initial assignment and continuations, as well as higher bandwidth assigned.

The present invention specifically addresses the following issues:

1. The coordination that is needed between cell sites to facilitate burst admission control and resource assignment for bursts;
2. Back-off procedures to retry for a burst when there are no resources available; and
3. Synchronization between the burst retry requests from different nodes to facilitate fair and efficient allocation of resources.

The present invention is directed to schemes with different levels of complexity. Simpler algorithms and simpler implementations trade off efficiency for simplicity. The variations of the schemes for the case when the supplemental channels are supported on only one handoff leg (i.e., simplex burst mode) are also discussed.

The present invention is directed to two approaches for burst admission (i.e., the assignment of supplemental channels). These two approaches are referred to as (1) asynchronous reassignment and (2) synchronous reassignment.

The term "initial assignment" refers to the process whereby an active node (i.e., either a mobile data user or a mobile data user proxy at the IWF, which has already been assigned a single fundamental code channel) makes an initial request for additional bandwidth for one or more supplemental channels and the burst control function (at least partially) satisfies that request by allocating one or more supplemental channels to that node for a specified period of time. The term "reassignment" refers to the process whereby an active node requests the continued allocation of the one or more supplemental channels at the expiration of the time period of its current (i.e., on-going) assignment. Depending on the implementation, reassignment could be limited to continuation of the supplemental channels from a previous assignment, or it could allow either increases or decreases in the number of supplemental channels.

An assignment (either an initial assignment or a reassignment) is referred to as being asynchronous if the burst control function satisfies the request as soon as it is received from the requesting node. On the other hand, a reassignment is referred to as being synchronous if the burst control function coordinates the reallocation of supplemental channels to various nodes to occur simultaneously at specific times, referred to as synchronous reassignment epochs.

Under both the approaches of the present invention, the initial assignment of supplemental channels to a requesting node is made asynchronously when resources are available. (In alternative embodiments, initial assignment could be made synchronously, but the delays in granting initial requests would result in inefficient utilization of system resources.) The two main approaches differ, however, in how reassignments are made. As their names suggest, under the asynchronous reassignment approach, reassignments are made asynchronously, while, under the synchronous reassignment approach, reassignments are made synchronously.

The asynchronous reassignment approach may be advantageous when simplicity is desired and the data traffic volume is low. This approach is especially efficient if supplemental channels are assigned in simplex burst mode, where soft handoff is supported for the fundamental channel, but not for the supplemental channels. The synchronous reassignment approach is very important for efficient usage of the resources if soft handoff is supported for supplemental codes or if the data traffic is high.

Both the asynchronous and synchronous approaches of the present invention provide a framework to support the following features:

Higher priority to on-going bursts;

Gradual increment or decrement of the number of codes to ensure that the higher layers (e.g., transmission control protocol (TCP)) react gracefully to the change of bandwidth and avoid frequent reassignment of the network resources (e.g., packet handlers, packet pipe resources); and Lower priority to bursts that have been in progress for a long period to prevent unfair hogging of resources. Hogging refers to excessive use of system resources (e.g., CDMA spreading codes, processing hardware elements, forward-link power, or allocation from reverse-link interference budget) that prevents other users from receiving their fair share of resources.

The following guidelines minimize inefficiency that results from distributed burst coordination. At each cell site's burst admission controller, a burst admission control scheme is implemented after all the requests from all burst request managers from the mobile switching center have been received.

1. Consistency: For efficient utilization of resources, multiple BACs should make consistent reassignments. This can be achieved if the reassignments are done according to consistent rules and based on information that is known consistently across different BACs, e.g., , causing assignment by at most one BAC and increasing assignment by at most two supplemental channels.

2. Fairness: If all bandwidth at a cell site is used up (i.e., full load), then the cell site should free up bandwidth from nodes with higher numbers of channels, and assign them to nodes with lower numbers of channels. This rule is further subject to the following efficiency rule.

3. Efficiency: In case bandwidth is available (i.e., all resources at a cell site are not used up), then increase the number of channels assigned to all nodes (including the ones with high numbers of supplemental channels), until all the bandwidth is used up.

4. Slow Decrease: Drastic decreases in the number of supplemental channels may lead to TCP time-outs. Better to decrease by exactly one. Again, following this consistently across BACs means that no BAC makes a drastic reduction, leading to efficient use of bandwidth.

5. Moderate Increase: The bandwidth and/or power freed up by the nodes with more channels is shared equally among the nodes with fewer channels. Depending on the bandwidth and/or power freed up, 0, 1 or more (e.g., up to 2) additional supplemental channels may be assigned to nodes with fewer channels. If the other BACs cannot permit the increase, the wastage is limited to the bandwidth and/or power freed up by the slow decrease.

6. Reassignment to Simplex: Some or all of the freed-up bandwidth and/or power may get reassigned to the simplex burst mode users whose BRM is co-located with the BAC.

Using the above reassignment rules, each BAC sends the proposed reassignments to the BRM, which accepts the minimum of the reassignments for all supplemental legs. This accepted reassignment is sent back to all the BACs, which can update the committed resource usage. The unassigned usage is then limited to this small perturbation in the reassignment. This inefficiency is further reduced after the BAC does further local reassignment of bandwidth and/or power to simplex bursts as follows.

For local reassignment to simplex legs for users whose BRM is co-resident with the BAC, the bandwidth and/or power that is freed up after this coordination across soft handoff legs can be reassigned to simplex burst mode users using similar rules of slow decrease and moderate increase as above. Assigning larger bandwidth and/or power to simplex burst mode users results in overall higher system-wide throughput which is beneficial to all users, including those in soft handoff.

Asynchronous Reassignment

Under the asynchronous reassignment approach, all assignments, including the reassignment of on-going bursts, are made asynchronously. When a new request arrives and one of the cell sites involved is unable to assign any resources, the new request is asked to retry at the time when the earliest on-going burst at the loaded cell site will expire (an asynchronous reassignment epoch). At that instant, the new request will be re-assigned resources that can be freed up from the on-going burst. Depending on the implementation, other on-going bursts might not be involved in the re-assignment. In other implementations, however, the amount of resources reassigned to on-going bursts may be gradually reduced in order to free up resources for previously blocked users.

As suggested earlier, the asynchronous reassignment approach is particularly useful when the network assigns bursts in simplex burst mode. In simplex burst mode, supplemental channels are assigned for communications with a mobile for only one cell site at a time, even when the mobile is in soft handoff. The burst control function selects the appropriate cell site based on pilot channel measurements reported from the mobile and from the load information for the neighboring cell sites. When an initial burst request is made by a node (as opposed to a burst continuation request), available resources are allocated. When the cell site is unable to assign any resources, the node is asked to resubmit its initial burst request after a specified time (e.g., the next available asynchronous reassignment epoch, which is the earliest time when a currently active burst at the cell site will expire). The node will then resubmit its initial burst request after a random back-off period following that specified time. The back-off period is chosen in such a way that burst continuation requests for reassignment of currently active bursts are given priority over initial burst requests, subject to limiting the hogging of resources by a single user. In addition, the burst control function increases subsequent back-off periods as a function of the number of recent requests that are blocked.

Figure 3:
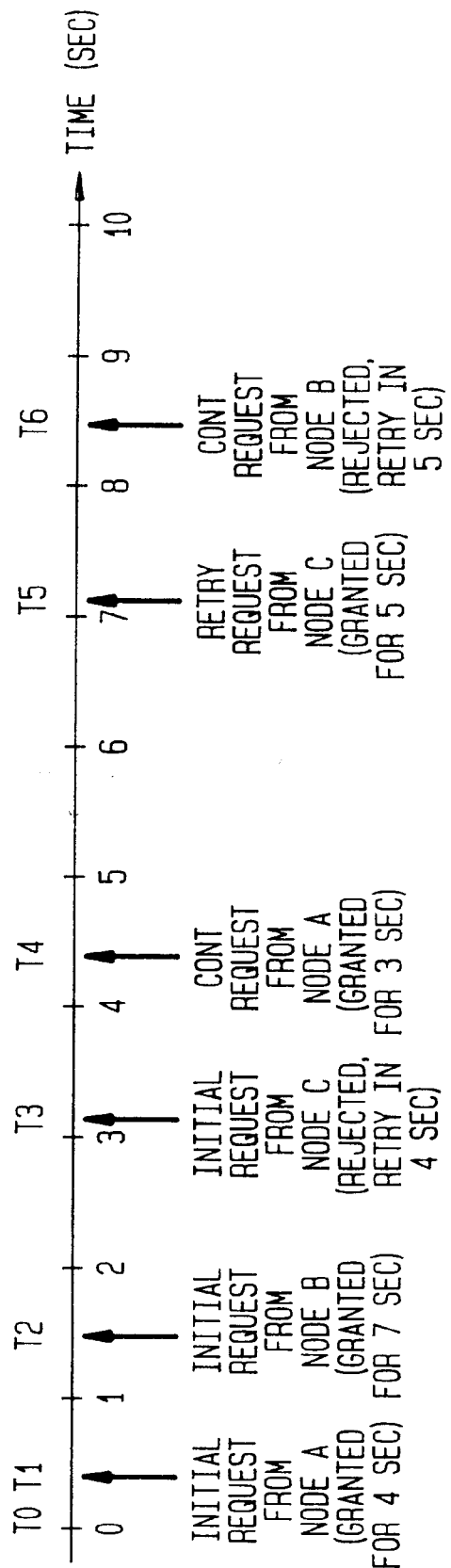
FIG. 3 shows an exemplary diagram demonstrating the timing of events, according to the asynchronous reassignment approach of the present invention.

FIG. 3 shows an exemplary diagram demonstrating the relative timing of events, according to the asynchronous reassignment approach of the present invention. FIG. 3 shows a 10-sec interval starting at an arbitrary time T0=0 sec. During that 10-sec interval the following six burst-request events occur:

Time T1: An initial assignment request is received for Node A and granted for 4 seconds.

Time T2: An initial assignment request is received for Node B and granted for 7 seconds.

Time T3: An initial assignment request is received for Node C and rejected; Node C is told to retry in 4 seconds.

Time T4: At the end of its initial assignment, Node A issues a continuation request, which is granted for 3 seconds.

Time T5: At the designated time, Node C issues a retry request, which granted for 5 seconds.

Time T6: At the end of its initial assignments, Node B issues a continuation request, which is rejected; Node B is told to retry in 5 seconds.

This exemplary diagram demonstrates the asynchronous nature of both the initial requests as well as the continuation and retry requests under the asynchronous reassignment approach of the present invention.

Synchronous Reassignment

As described earlier, the synchronous reassignment approach is a two-step approach consisting of asynchronous initial assignments of supplemental channels followed by synchronous reassignment epochs. If the reassignment epochs are not synchronized across cells, users in soft handoff are unlikely to have resources available at all cell sites simultaneously. This argues for synchronized reassignment epochs across all cells. Since multiple new and on-going bursts across a combination of multiple cells are involved, reassignments are best handled synchronously across multiple cells.

In the case of synchronous reassignment, the burst mode is assumed to be slotted, e.g., with a slot duration on the order of a few seconds. When resources are available, initial assignments of supplemental channels to nodes requesting burst transmissions are done asynchronously. That is, supplemental channels are assigned with whatever resources are available, as soon as the requests come in. These asynchronous initial assignments avoid unnecessary delay in the initial assignments. Initial assignments are made to last until the beginning of the next synchronous reassignment epoch. If there are no resources available, then the nodes are requested to retry at the beginning of the next synchronous reassignment epoch. Retries of previously rejected requests and continuation requests for reassignment of supplemental channels for on-going bursts are all handled synchronously at the reassignment epochs which coincide with the slot times.

In particular, when a request for initial assignment of supplemental channels is received at a cell site, the burst admission control allocates the available resources. If there are no resources available at the given instant, but some will become available at synchronous reassignment epoch time t, the BAC sends a message to the node asking it to retry at synchronous reassignment epoch time t. The initial assignment of supplemental channels to nodes requesting burst transmissions is preferably done asynchronously (when resources are available). Alternatively, if initial assignments are only done at synchronous epochs, unnecessary delay would be introduced in the assignments. Moreover, the initial assignments should be for such a duration that they can be re-evaluated for reassignment along with other on-going bursts. If an initial assignment is denied and the requesting node is asked to retry, then the retry delay should be such that it is re-evaluated with other requests and on-going bursts.

For asynchronous assignment in response to initial requests, if an immediate assignment of multiple codes can be made, it is implemented under the following guidelines. The increased assignment of supplemental channels is moderately limited (e.g., 2–4). It is expected that the transport control protocol (TCP) for Internet data will not be able to immediately exploit a larger number of supplemental channels. And if there is need for subsequent reassignment, then shrinking the number of code channels at that point could be disadvantageous. If the load is light, the number of channels may be increased at a subsequent reassignment.

Asynchronous initial assignment favors simplex mode bursts, since they are more likely to get assigned resources at asynchronous epochs. Soft handoff burst allocations have a better chance of getting in if multiple cell sites happen to be doing reassignments at a given time. This is the case for moderate to heavy loads. Thus, at light loads, this method allows a single user to get access quickly to a large number of supplemental channels. At moderate to heavy loads, asynchronous initial assignment favors simplex mode burst allocations.

To permit more equitable access, the resources at all cells (or sectors) are reassigned synchronously. To ensure fairness among users within a cell, recent new requests, retries, and continuation requests are all re-evaluated simultaneously. With asynchronous reassignments, it may be possible to ensure fairness by assigning fewer than the maximum available codes in consideration of other requests, but that may lead to underutilization of the resources.

Burst continuation requests, and those initial burst requests that were previously rejected and asked to retry, are processed at the slot boundaries. These slot boundaries are synchronized across all of the cell sites to ensure that resource allocation for mobiles that are in soft handoff can be made simultaneously at all of the cell sites. Admitted bursts are assigned resources for a duration that will terminate at the next synchronous reassignment epoch (e.g., up to 5 seconds later). If denied, the node will be asked to retry at the next synchronous reassignment epoch time. As such, all retry requests and continuation requests for all nodes will be synchronized at epoch times. All cell sites involved (including the lightly loaded ones) will note that retries will arrive at the next synchronous reassignment epoch time. If other new requests arrive at the lightly loaded cell sites that are awaiting this retry, they may be made asynchronous assignments. However, these requests will also be reassigned along with the retry at the next synchronous reassignment epoch time.

Figure 4:
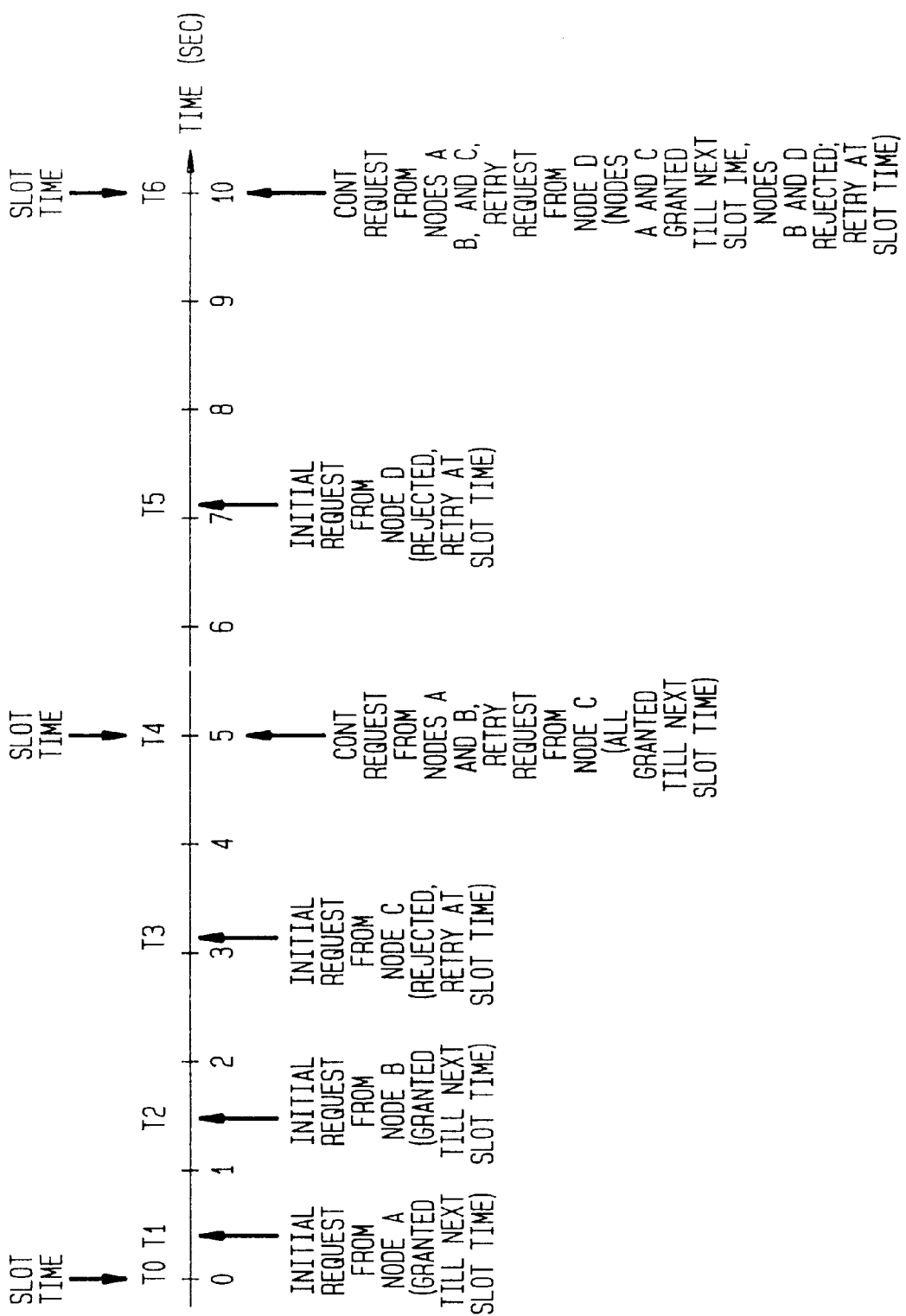
FIG. 4 shows an exemplary diagram demonstrating the timing of events, according to the synchronous reassignment approach of the present invention.

FIG. 4 shows an exemplary diagram demonstrating the relative timing of events, according to the synchronous reassignment approach of the present invention. Like FIG. 3, FIG. 4 shows a 10-sec interval starting at an arbitrary time TO=0 sec. Unlike FIG. 3, however, the diagram of FIG. 4 is slotted with slot times occurring every 5 seconds starting at time TO. During that 10-sec interval the following six burst request events occur:

Time T1: An initial assignment request is received for Node A and granted till next synchronous reassignment epoch time.

Time T2: An initial assignment request is received for Node B and granted till next synchronous reassignment epoch time.

Time T3: An initial assignment request is received for Node C and rejected; Node C is told to retry at next synchronous reassignment epoch time.

Time T4: At the next synchronous reassignment epoch time which corresponds to the slot time at time 5 seconds, Nodes A and B issue continuation requests and Node C issues a retry request, all of which are granted till the next synchronous reassignment epoch time.

Time T5: An initial assignment request is received for Node D and rejected; Node D is told to retry at next synchronous reassignment epoch time.

Time T6: At the next synchronous reassignment epoch time which corresponds to the slot time at time 10 seconds, Nodes A, B, and C issue continuation requests and Node D issues a retry request; Nodes A and C are granted till the next synchronous reassignment epoch time, and Nodes B and D are rejected and told to retry at the next synchronous reassignment epoch time.

This exemplary diagram demonstrates the asynchronous nature of the initial requests and the synchronous nature of the continuation and retry requests under the synchronous reassignment approach of the present invention.

Figure 5:
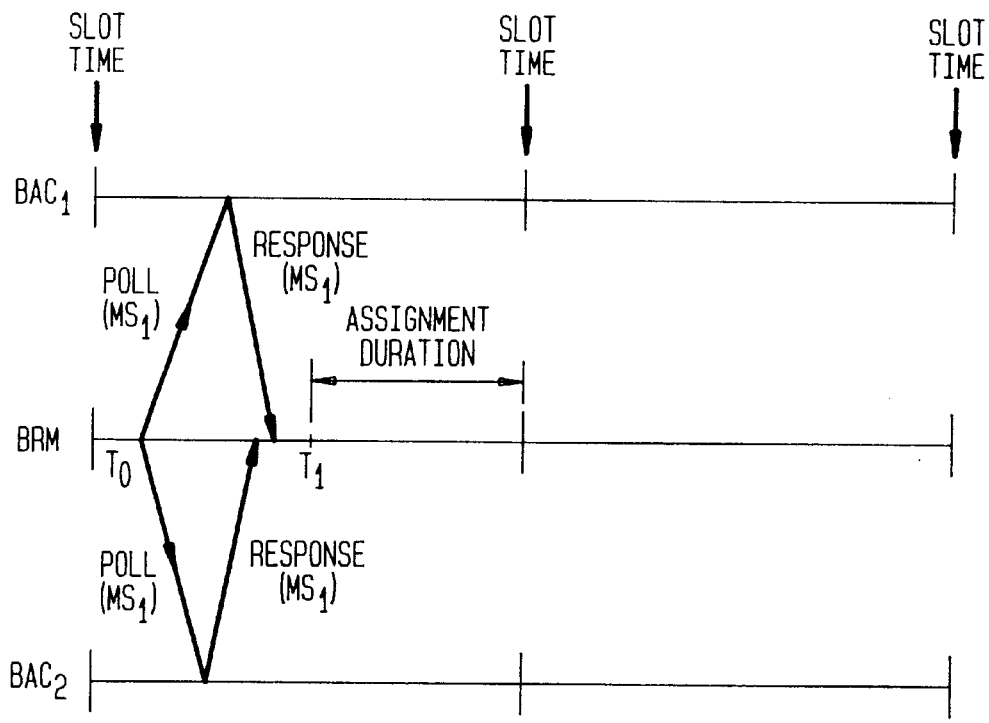
FIG. 5 shows an exemplary diagram demonstrating the coordination across multiple cells for initial assignments, according to the synchronous reassignment approach of the present invention.

FIG. 5 shows an exemplary diagram demonstrating the coordination across multiple cells for initial assignments, according to the synchronous reassignment approach of the present invention, where Mobile Station 1 ($MS_1$) is in soft handoff with Cell 1 and Cell 2. The events shown in FIG. 5 are:

A burst request for $MS_1$ arrives at the BRM at time $T_0$.

The BRM polls the BAC at Cell 1 ($BAC_1$) and the BAC at Cell 2 ($BAC_2$) for resource availability at time $T_0$.

Responses from $BAC_1$ and $BAC_2$ arrive at the BRM prior to time $T_1$ and are collated by the BRM.

The BRM assigns a burst for a duration from time $T_1$ until the next slot time, based on responses received from the BACs. If the response from at least one BAC indicates that there are insufficient resources available, then the requesting node is asked to retry at the next slot time.

Figure 6:
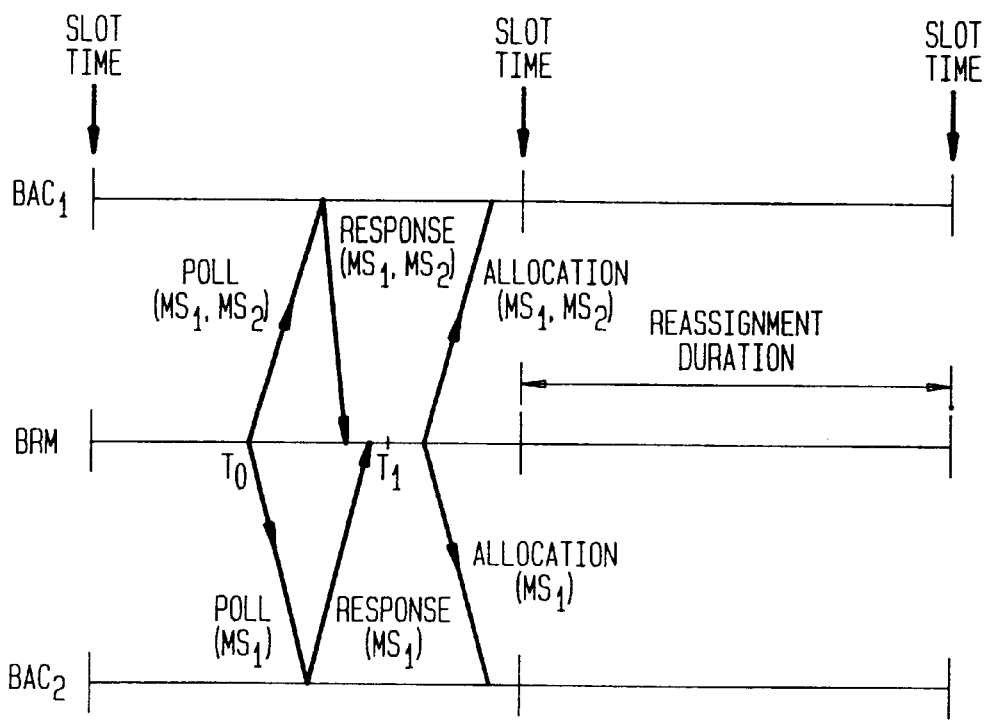
FIG. 6 shows an exemplary diagram demonstrating the coordination across multiple cells for reassignments, according to the synchronous reassignment approach of the present invention.

FIG. 6 shows an exemplary diagram demonstrating the coordination across multiple cells for reassignments, according to the synchronous reassignment approach of the present invention, where Mobile Station 1 ($MS_1$) is in soft handoff with Cell 1 and Cell 2, and Mobile Station 2 ($MS_2$) is in simplex burst mode with Cell 1. The events shown in FIG. 6 are:

All reassignment requests arrive at the BRM prior to time $T_0$.

The BRM polls $BAC_1$ and $BAC_2$ for resource availability at time $T_0$.

Responses from $BAC_1$ and $BAC_2$ arrive at the BRM prior to time $T_1$ and are collated by the BRM.

The BRM reassigns bursts for a duration from the next slot time until the following time slot, according to the responses received from the BACs. For example, if $BAC_1$ can allocate 20 kbps to $MS_1$, but $BAC_2$ can allocate only 10 kbps to $MS_1$, then the BRM determines it can allocate only 10 kbps to $MS_1$. If there are insufficient resources for a requesting node, then the requesting node is asked to retry at the next slot time.

Implementation Details

The asynchronous reassignment approach may be implemented with the help of two counters at the cell site: Block_counter and Continue_counter. Block_counter tracks the number of recent blocked service requests and Continue_counter tracks the number of service continuations granted per node. Block_counter determines the back-off periods giving larger back-offs for higher values of the counter. Additionally, the cell site uses Continue_counter to control the amount of continuation allowed in order to prevent hogging of radio resources by one node while minimizing unnecessary access messaging.

One goal of the present invention is that no single high-speed data user should be able to monopolize network resources. In order to support this goal, the asynchronous reassignment approach allows a finite amount of burst continuation for each high-speed data user.

One particular implementation of a synchronous reassignment approach of the present invention is referred to as the simplex-mode asynchronous fair share (AFS) scheme. The AFS scheme is to be implemented at the burst admission controller in the serving cell site. The BAC is a function capable of evaluating the requests from all of the high-speed data users within the cell (or sector).

The AFS scheme assumes that up to seven supplemental channels can be assigned in simplex mode to a mobile, whereas the fundamental channel may be maintained in soft handoff. The cell site supporting the supplemental channels is referred to herein as the serving cell site. The serving cell site is selected based on the mobile-generated pilot strength measurement message (PSMM) every time the BRM receives a burst request.

As described earlier, two instances of the burst control function are implemented simultaneously: one instance for the forward link to handle the assignment of supplemental forward-link channels for forward-link communications with its mobiles and one instance for the reverse link to handle the assignment of supplemental reverse-link channels for reverse-link communications for various mobiles. The AFS scheme described below may be applied to the forward link when bursts of supplemental channels are on only one leg and, under certain conditions (e.g., when bursts are on one leg and the burst-induced interference to other cell sites is limited), to the reverse link as well. Although the AFS scheme assumes no coordination between cell sites during soft handoff, other schemes may involve such coordination. This coordination happens, in the forward link, when bursts of supplemental channels are on two or more legs and, in the reverse link, when burst-induced interference to other cell sites is sufficiently large, even when bursts are on only one leg. Coordination may also be performed in the forward link when bursts are on only one leg if, for example, coordination of power usage is desirable.

The AFS scheme uses the following parameters:

Block_counter—counter reflecting the number of outstanding blocked requests from all nodes.

Continue_counter[node]—counter reflecting the number of consecutive bursts granted to a node.

$T_{BURST}$—specified duration of a burst.

$T_{BURST\_MAX}$—maximum allowable burst duration.

$T_{RETRY}$—specified time to retry denied request for supplemental channels $T_{RETRY\_SMALL}$—upper limit for retry delay calculation for new or previously blocked nodes, lower limit for retry delay calculation for node that is a resource hogger.

$T_{RETRY\_LARGE}$—upper limit for retry delay calculation for a resource hogger.

$T_{CURRENT}$—current time.

$T_{END}$—end time for an on-going burst.

Continue_threshold—maximum number of blocked requests in the sector allowing bursting node to continue without back-off.

Backoff_threshold—value of Block-counter that triggers the increase in back-off delay.

Min_number of continuations—guaranteed number of consecutive bursts per node.

Max_number_of_continuations—maximum number of consecutive bursts allowable per node.

The AFS scheme is guided by the following principles:

1. All requests are processed asynchronously.
2. All requests are satisfied using a greedy scheme approach as long as the number of supplemental channels assigned is equal to the smaller of the number of supplemental channels allowed by the forward power budget (or reverse interference budget) and the number of supplemental channels requested by the node.
3. All bursts are granted for $T_{BURST}$=min($T_{BURST\_MAX}$, $T_{BURST}$ requested by the node).
4. The cell site uses Block_counter to count how many blocking messages it has sent since the last grant.
5. If no supplemental channel can be granted by the serving cell site, a blocking message is sent back to the node asking it to retry after $T_{RETRY}$=Random[$T_{END}$, $T_{END}+2^{(N-1)} T_{RETRY\_SMALL}$] (i.e., binary exponential back-off), where Random is a function that randomly selects a value between the two specified limits, $T_{END}$ is the next time that an on-going burst ends, and N=Round_up (Block_counter/Backoff_threshold), where Round_up is a function that rounds to the next higher integer. The values of $T_{END}$ are stored in the ordered list by the BAC and calculated as follows: a) all entries in the list that are less than $T_{CURRENT}$ (i.e., the current time) are deleted; b) if the list is empty, then $T_{END}=T_{CURRRENT}$; c) otherwise, $T_{END}$=smallest entry in list.
6. At every blocked request, the serving cell site stores the value of $T_{RETRY}$ in an ordered list.
7. Before processing every new request, the serving cell site decrements Block_counter by the number of entries that have expired in the $T_{RETRY}$ list. This is done whether the request is blocked or accepted. Alternatively, if maintaining the $T_{RETRY}$ list is complicated, the cell site can reset Block_counter to zero whenever a burst is granted to any new or retrying node, but not to a continuing node.
8. When a burst is nearing its end ($T_{CURRENT}=T_{END}-\Delta T$), the BRM may receive a continuation request. The BRM generates a message to the node, indicating whether it will accept the continuation request based on the following:
    (a) In order to prevent hogging of resources by continuing nodes, when resources are limited (i.e, when one or more other recent requests have been rejected as indicated by Block_counter>0), a hard limit is placed on the number of consecutive continuations by any node. Thus, if (Block_counter>0) and (Continue_counter[node]>=Max_number_of_continuations), then the BRM rejects the continuation request.
    (b) Otherwise, the node is not a hogger of resources, and if the number of recently rejected requests is less than a specified threshold (i.e., Block_counter<Continue_threshold), then the BRM indicates that the continuation request will be accepted immediately, assuming that sufficient resources are still available.
    (c) Otherwise, the number of recently rejected requests has reached the threshold and if the node has already received its guaranteed minimum number of continuations (i.e., Continue_counter[node]>=Min _number_of_continuations), then the BRM rejects the continuation request.
    (d) Otherwise, the node has not yet received its guaranteed minimum number of continuations, in which case the BRM indicates that the continuation request will be accepted immediately, assuming that sufficient resources are still available.

When a continuation request is rejected, the BRM indicates that the continuation request must be retried after $T_{RETRY}$=Random [$2^{(N-1)}T_{RETRY\_SMALL}$, $2^{(N-1)} T_{RETRY\_LARGE}$], where N=Round_up (Block_counter/Backoff_threshold). The retry request is treated as any other initial request. This procedure forces some controlled amount of continuation in the cell site.

Various parameters in the AFC scheme can be made mobile priority specific. This permits data users with better quality of service to obtain higher data rates or smaller delays.

Figure 7:
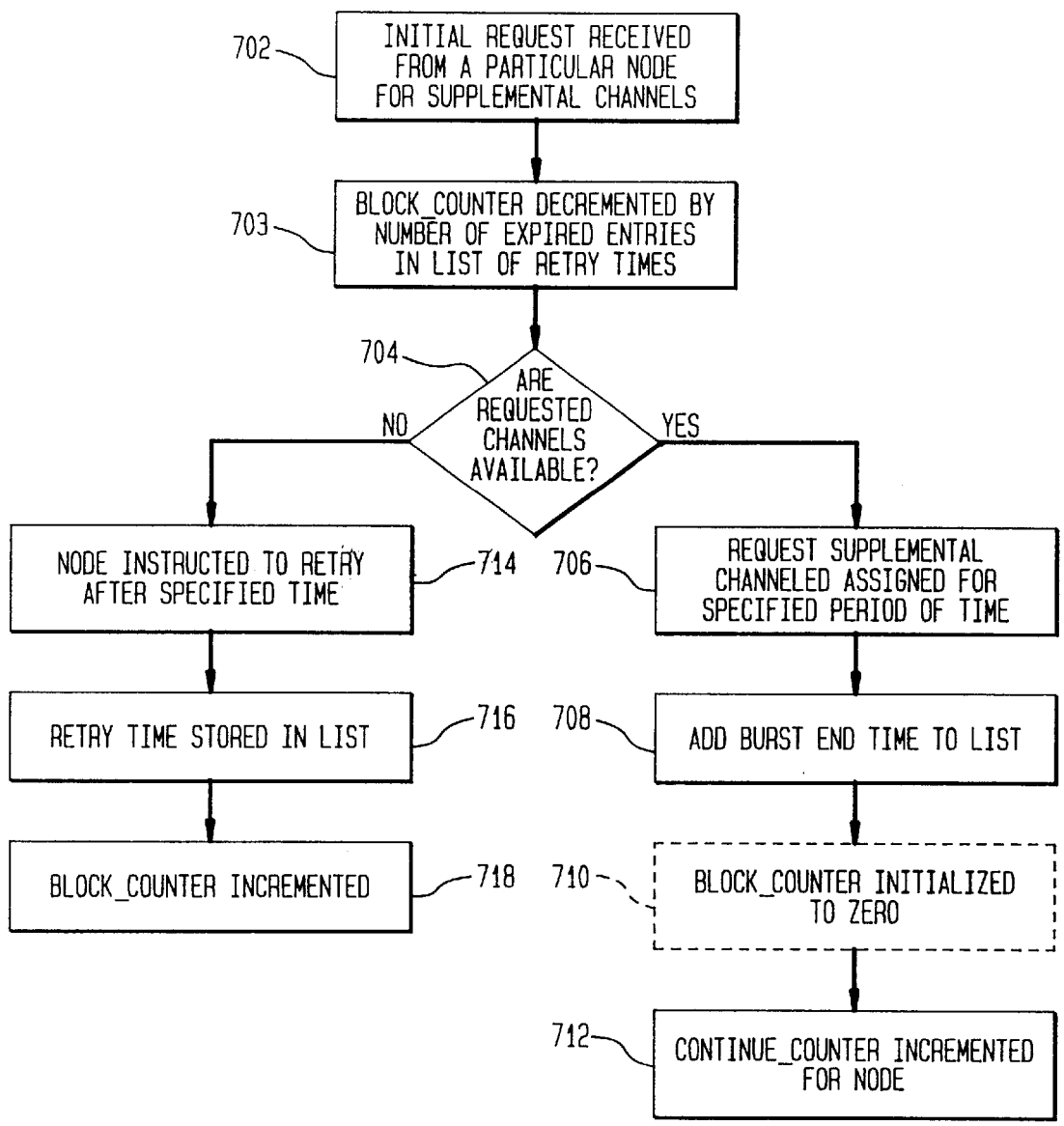
FIG. 7 shows a flow diagram of the processing implemented by the burst admission control in the serving cell site for an initial request for supplemental channels, according to the asynchronous reassignment approach of the present invention.

FIG. 7 shows a flow diagram of the processing implemented by the burst admission control in the serving cell site for an initial request for supplemental channels from a node, where the node is either a particular mobile requesting supplemental channels for the reverse link or the mobile user proxy at the IWF requesting supplemental channels for the forward link. The processing of FIG. 7 conforms to the guiding principles outlined above.

In particular, after receiving an initial request for supplemental channels from a particular node (step 702 of FIG. 7), the burst admission control decrements Block_counter by the number of entries in the retry list that have recently expired (step 703) and determines whether there are supplemental channels available to grant the initial request (step 704). If so, the burst admission control transmits a message to the requesting node assigning one or more specific supplemental channels for a specified period of time (step 706) and adds the corresponding burst end time to its list of burst end times (step 708). Depending on the availability of supplemental channels, the number of supplemental channels assigned may be less than the number requested by the node. The burst admission control (optionally) initializes Block_counter to zero (step 710) and increments Continue_counter for the particular node (step 712). Optional step 710 is implemented only if certain other steps are omitted (e.g., steps 703 and 716).

If, on the other hand, there are no supplemental channels available, the burst admission control A sends a blocking message to the requesting node instructing it to resubmit its request after a specified time (step 714). The burst admission control then stores this retry time in its retry list (step 716) and be increments Block_counter (step 718).

The resubmission of a request for supplemental channels by a node whose immediately preceding request was blocked by the burst admission control (whether the preceding request was an initial request or a continuation request) is treated by the burst admission control as if it were an initial request. As such, the procedure of FIG. 7 is followed for retry requests as well as for initial requests. Continuation requests, however, are treated differently by the burst admission control.

Figure 8:
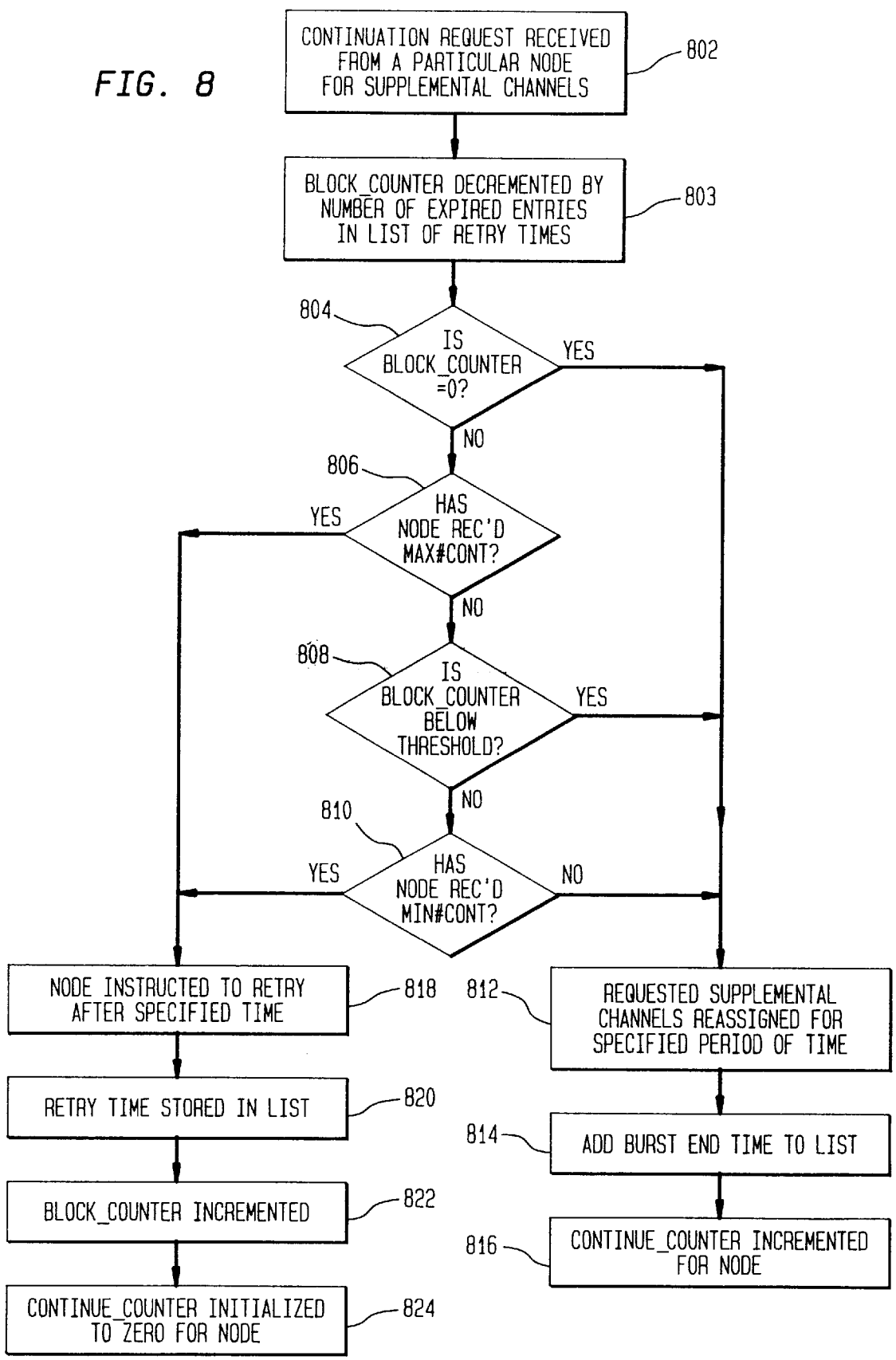
FIG. 8 shows a flow diagram of the processing implemented by the burst admission control in the serving cell site for a continuation request for reassignment of supplemental channels, according to the asynchronous reassignment approach of the present invention.

FIG. 8 shows a flow diagram of the processing implemented by the burst admission control in the serving cell site for a continuation request from a node, where the node is either a particular mobile requesting reassignment (i.e., another burst) of particular supplemental channels for the reverse link or the serving cell site itself requesting reassignment of particular supplemental channels for the forward link to a particular mobile. As was the case with the processing of FIG. 7, the processing of FIG. 8 conforms to the guiding principles outlined earlier.

In particular, after receiving a continuation request for particular supplemental channels from a .particular node (step 802 of FIG. 8), the burst admission control decrements Block_counter by the number of entries in the retry list that have recently expired (step 803) and then determines whether or not to grant the continuation request. If resources are available, as indicated by Block_counter being zero (step 804), then the continuation request will be granted. Otherwise, resources are limited and, if the node has already received its maximum number of continuations (step 806), then the continuation request will be rejected. Otherwise, the node is not a hogger of resources and if the number of recently rejected requests is less than a specified threshold (i.e., if Block_counter is less than Continue_counter) (step 808), then the continuation request will be granted. Otherwise, the number of recently rejected requests has reached the threshold and, if the node has already received its guaranteed minimum number of continuations (i.e., Continue_counter[node]>=Min_number_of_continuations) (step 810), then the BRM rejects the continuation request. Otherwise, the node has not yet received its guaranteed minimum number of continuations, in which case the BRM indicates that the continuation request will be accepted immediately. The number of supplemental channels can be the same or different for reassignments.

If the continuation request is to be granted, then the burst admission control reassigns the supplemental channels to the node for a specified period of time (step 812), adds the corresponding burst end time to its list of burst end times (step 814), and increments Continue_counter for the particular node (step 816).

If the continuation request is to be rejected, the burst admission control sends a blocking message to the requesting node instructing it to submit an initial request after a specified time (step 818). The burst admission control then stores this retry time in its list of retry times (step 820), increments Block_counter (step 822), and re-initializes Continue_counter for the particular node to zero (step 824).

As alluded to earlier, step 710 of FIG. 7 is implemented only if the following steps are omitted: steps 703 and 716 of FIG. 7 and steps 803 and 820 of FIG. 8.

The AFS scheme ensures that a small number of nodes will not prevent others from accessing the network. It also allows burst continuation, if the load is relatively light. The amount of allowable continuation is controlled by adjusting the value for Continue_threshold.

Some loss in the performance occurs when the serving cell site is changed during the back-off, because the back-off timer value applies to a particular serving cell site.

In alternative implementations of the asynchronous reassignment approach, one or more of the following principles may be operative:

Replies to blocked messages are not sent immediately, but at the next end of a burst in the sector.

These replies indicate that the burst is either accepted or blocked.

A finite number of accepted bursts are allowed to share available power. Blocked users are told to retransmit using the above scheme.

If a new node makes access when there are several blocked nodes queued up till the next end of a burst, and this new node is able to get some amount of forward power for the supplemental channels, then this power may be reassigned to the first node in the queue instead.

If a continuation request is accepted while Block_counter indicates that there are recently blocked users, then reassignment may be granted with a gradually reduced number of supplemental channels to accommodate blocked users when they retry.

Figure 9:
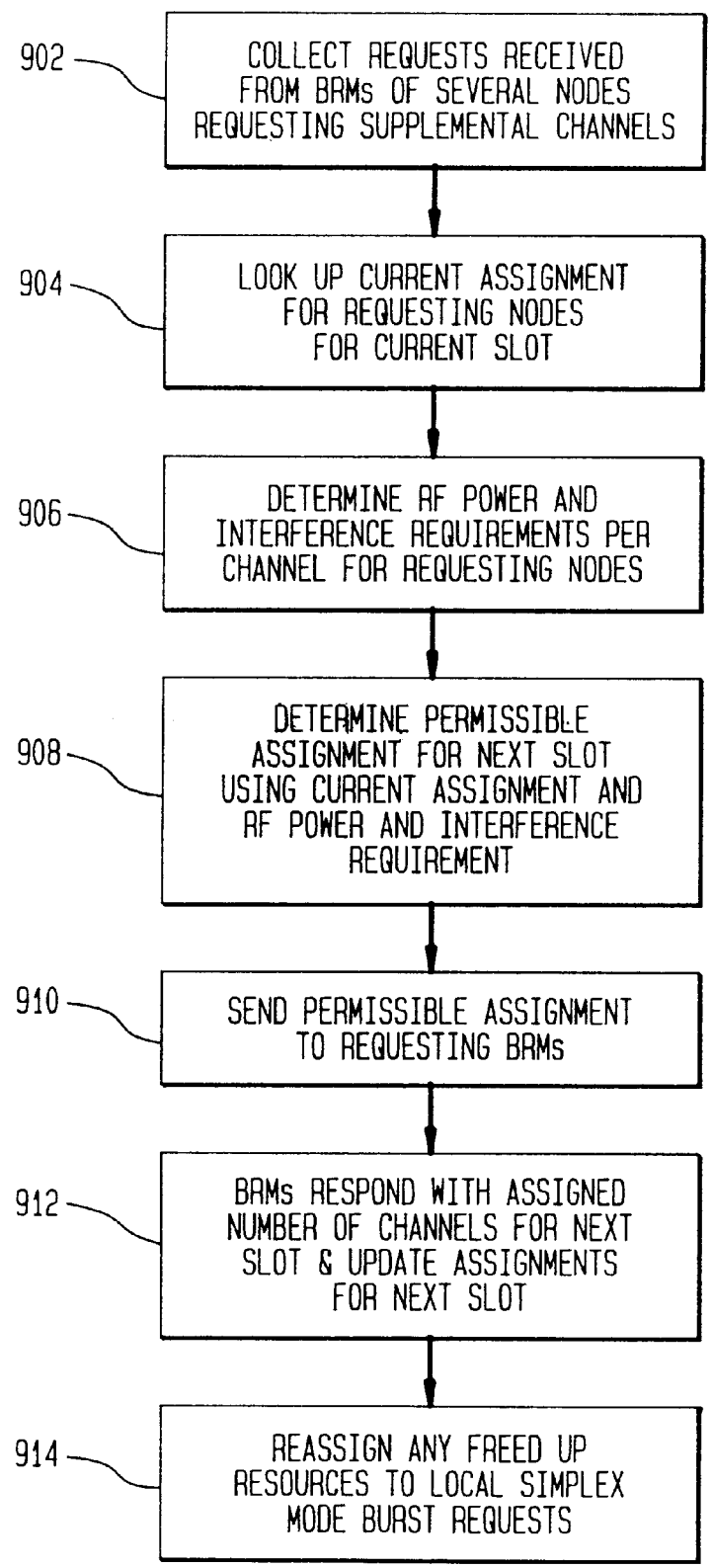
FIG. 9 shows a flow diagram of the processing implemented by the burst admission control at a particular cell site, according to the synchronous reassignment approach of the present invention.

Although the back-off periods have been described in the context of retry times $T_{RETRY}$ that are defined based on specific binary exponential functions, other suitable functions for determining back-off periods are also possible, including linear functions and constant functions. =FIG. 9 shows a flow diagram of the processing implemented by the burst admission control at a particular cell site, according to the synchronous reassignment approach of the present invention. In particular, the BAC collects requests received from the BRMs of several nodes (e.g., Nodes A, B, and C) requesting supplemental channels (step 902 of FIG. 9). The BAC looks up the current assignments ($M_A$, $M_B$, and $M_C$) for Nodes A, B, and C for the current slot (step 904) and determines the RF power and interference requirements per channel ($R_A$, $R_B$, and $R_C$) for Nodes A, B, and C (step 906). The BAC determines permissible assignments for the next slot ($P_A$, $P_B$, and $P_C$) using the current assignments and the RF power and interference requirements (step 908) and sends permissible assignments to the requesting BRMs (step 910). After responses are received from the BRMs with the assigned numbers of channels for the next slot, the BAC updates the assignments for the next slot (step 912). The BAC then reassigns any freed up resources to local simple-mode burst requests (step 914).

Figure 10:
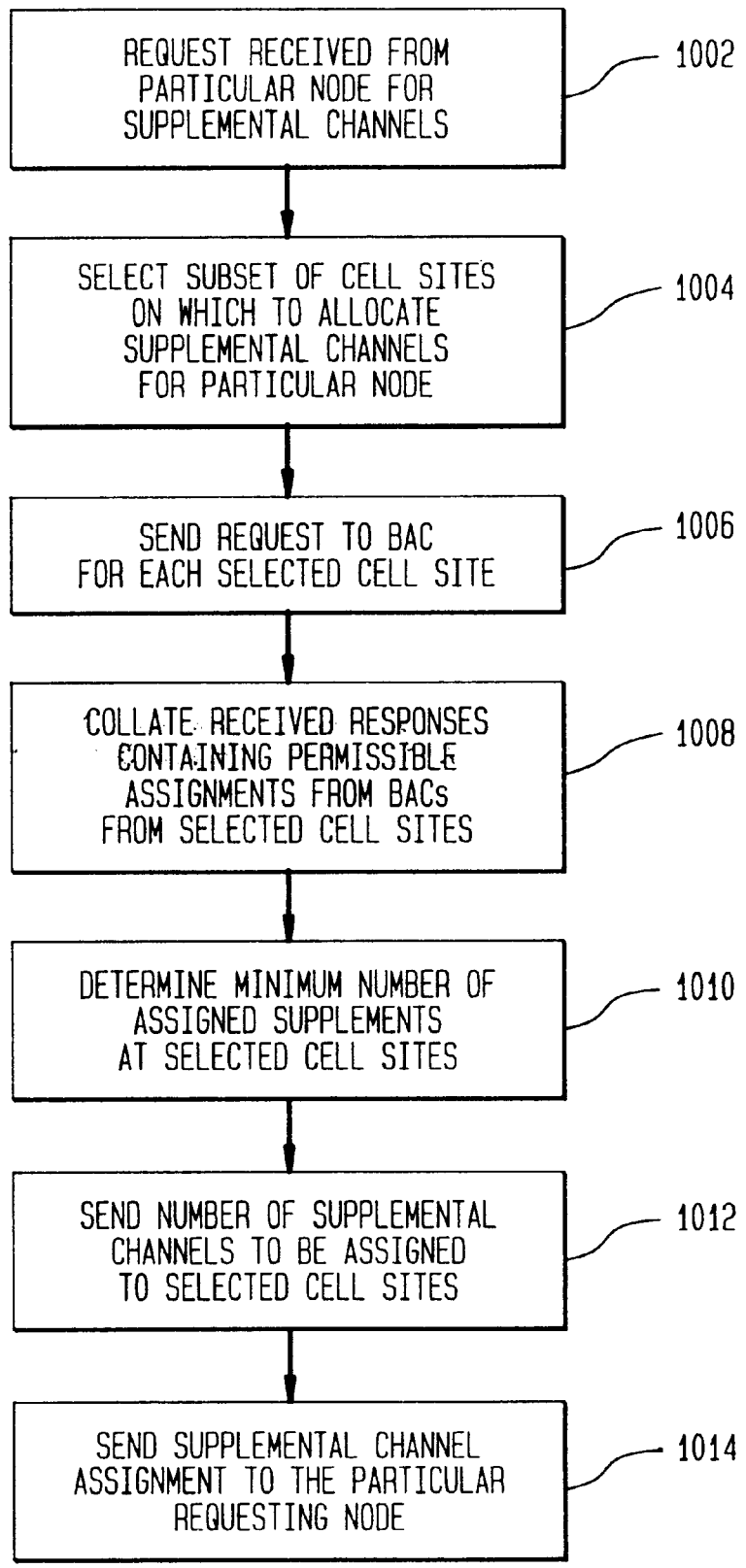
FIG. 10 shows a flow diagram of the processing implemented by the burst request manager, according to the synchronous reassignment approach of the present invention.

FIG. 10 shows a flow diagram of the processing implemented by the burst request manager, according to the synchronous reassignment approach of the present invention. In particular, the BRM receives a request from a particular node (e.g., Node A) for supplemental channels (step 1002 of FIG. 10). The BRM selects a subset of cell sites on which to allocate supplemental channels for Node A (step 1004) and sends a request to the BAC for each selected cell site (step 1006). The BRM collates responses received from the BACs for the selected cell sites containing permissible assignments (step 1008 and determines the minimum number (M) of assigned supplemental channels at the selected cell sites (step 1010). The BRM sends the value of M for the number of supplemental channels to be assigned to the selected cell sites (step 1012) and sends the supplemental channel assignment for the M channels to the requesting node (Node A) (step 1014). A value of M=0 indicates the need for Node A to retry at the next slot time.

Simulation Results

The AFS scheme was simulated for the forward link using the OPNET network simulation tool. As described above, the AFS scheme allows two different options for adjusting Block_counter: Option A, where the counter is reset on every new assignment of supplemental channels (as in step 710 of FIG. 7) and Option B, where the counter is decremented by the number of retries that were supposed to occur during the last burst transmission. The simulation results presented below were executed with Option B selected. The following parameter values were used for these simulations:

$T_{BURST\_MAX}$=5 sec;
$T_{RETRY\_SMALL}$=0.5 sec;
$T_{RETRY\_LARGE}$=2.5 sec;
Continue_threshold=3;
Backoff_threshold=1;
Min_number_of_continuations=3; and
Max_number_of_continuations=10.

The AFS simulation results are compared to simulations of a system in which no fair-sharing of resources is employed. System operation without fair sharing assumes that any user can continue bursting until it has all its backlogged data transmitted. Users whose requests are blocked retry after a random time between 0 and 2.5 sec. The number of consecutive retries after a blocked initial request is unlimited.

The AFS simulations assumed a fixed power budget allocation for high-speed data users over the duration of each simulation run. Simulations were executed for a power budget allowing for up to 14 supplemental channels to be allocated to one or more different nodes at the same time with a maximum of 7 supplemental channels for any one node. Each run simulates 5 hours (18,000 sec) of system operation.

Realistic non-real-time services (i.e., packet data services) are described best by a multi-service (on/off) model, which includes the following parameters:

Session arrival process (Poisson distribution). The session here is equivalent to one e-mail session, one file transfer protocol (ftp) transfer, one web-browsing session, etc. The session consists of one packet call (in the case of a file transfer) or one or more packet calls in the case of web browsing.

Number of packet calls per session (geometrically distributed).

Time between packet calls (geometrically distributed).

Number of packets in packet call (geometrically distributed or some other distribution function; could be one packet/call).

Inter-arrival time between packets in packet call (geometrically distributed).

Packet size. There are a number of models proposed for the packet size. For example, truncated Cauchy distribution (based on email usage over FUNET), uniform distribution (based on fleet management application using Mobitex wireless network), truncated exponential distribution (based on Railway application requirements ), truncated Pareto distribution (based on web-browsing application). Note that FUNET, Mobitex, and Railway are aggregate traffic models and the individual user packet size distributions resulting in these aggregate models are not well understood.

The following traffic model (web-browsing) is assumed in the simulations:

Number of users per sector: 5;
Idle time between consecutive Web sessions per user: exponentially distributed, with 45-sec mean;
Number of packet calls per session: constant, 5;
Packet call inter-arrival time within the session: exponentially distributed, with 25-sec mean;
Number of packets per packet call: constant, 25;
Packet inter-arrival time within the packet call: constant, 10 msec;
Packet size: exponentially distributed with 480-byte mean;
Packets are translated into byte stream by IWF and the burst request is sent to the BRM in the cell site for the total amount of data backlogged at the IWF; and
Delay statistics are collected for original higher layer messages (above IWF) as they are transmitted by the cell site.

Figure 11:
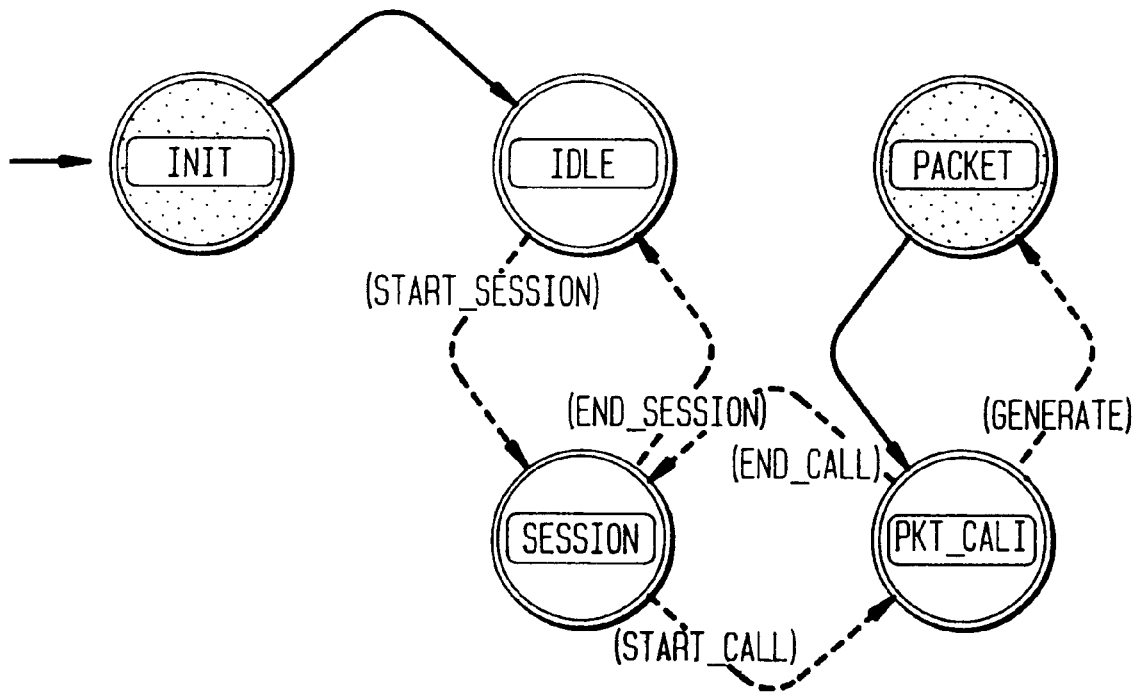
FIG. 11 shows a state machine for generating Web-like traffic for simulating the present invention.

The model reflects the significant burstiness of Internet traffic. Each packet call offers a mean load of 48 kilobytes per second, while each Web session offers a load of about 2.4 kilobytes per second. The resulting load on the network is about 16.5–17 kbps. Therefore, long-term network congestion occurs when the system is unable to provide more than two supplemental channels in the sector for significant periods of time. However, instantaneous congestion is quite possible even when there are a lot of supplemental channels available. FIG. 11 shows a state machine for generating Web-like traffic.

Figure 12A:
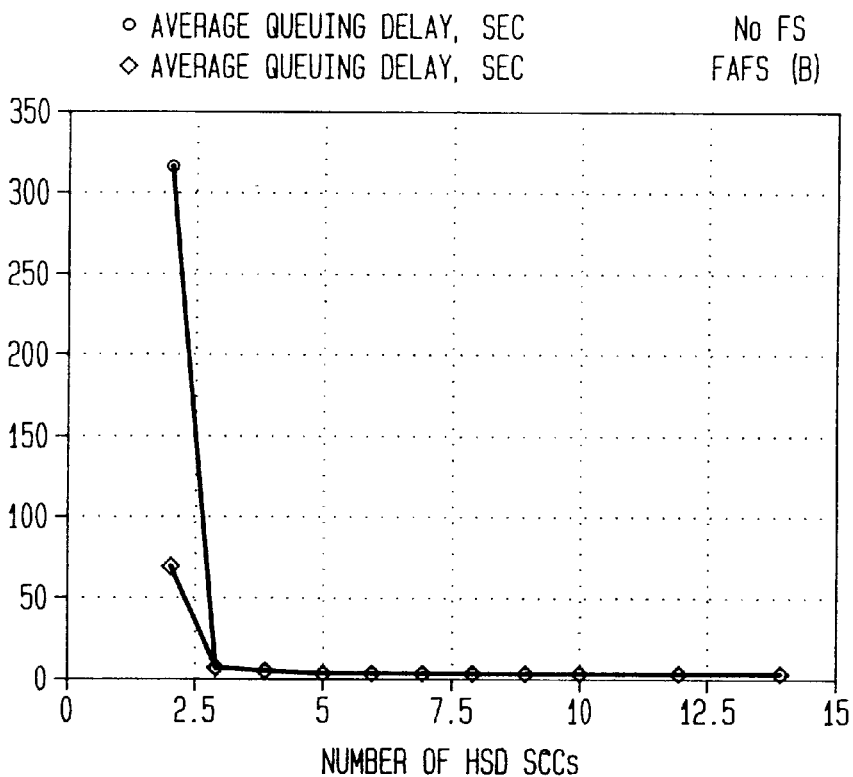
Figure 12B:
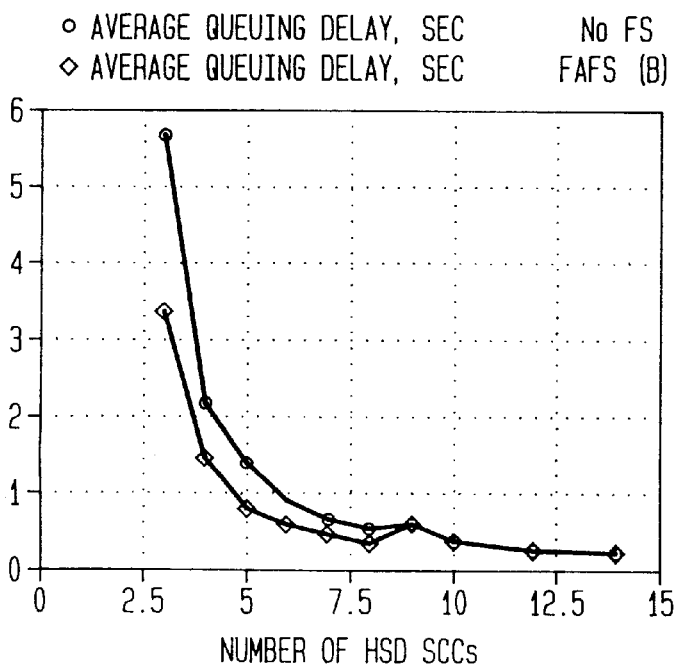

FIGS. 12(A)–(B) show the simulation results for the average access delay (per packet) as a function of the number of available supplemental channels. With the traffic model described above, maximum system capacity is reached with two 8-kbps supplemental channels. Thus, the average queuing delay grows significantly for a number of available supplemental channels smaller than three. FIG. 12(B) provides an expanded view of the delay in FIG. 12(A) for the number of supplemental channels ranging from 3 to 14. The AFS scheme provides average delay improvement seen by a user in a heavily loaded sector.

Figure 13:
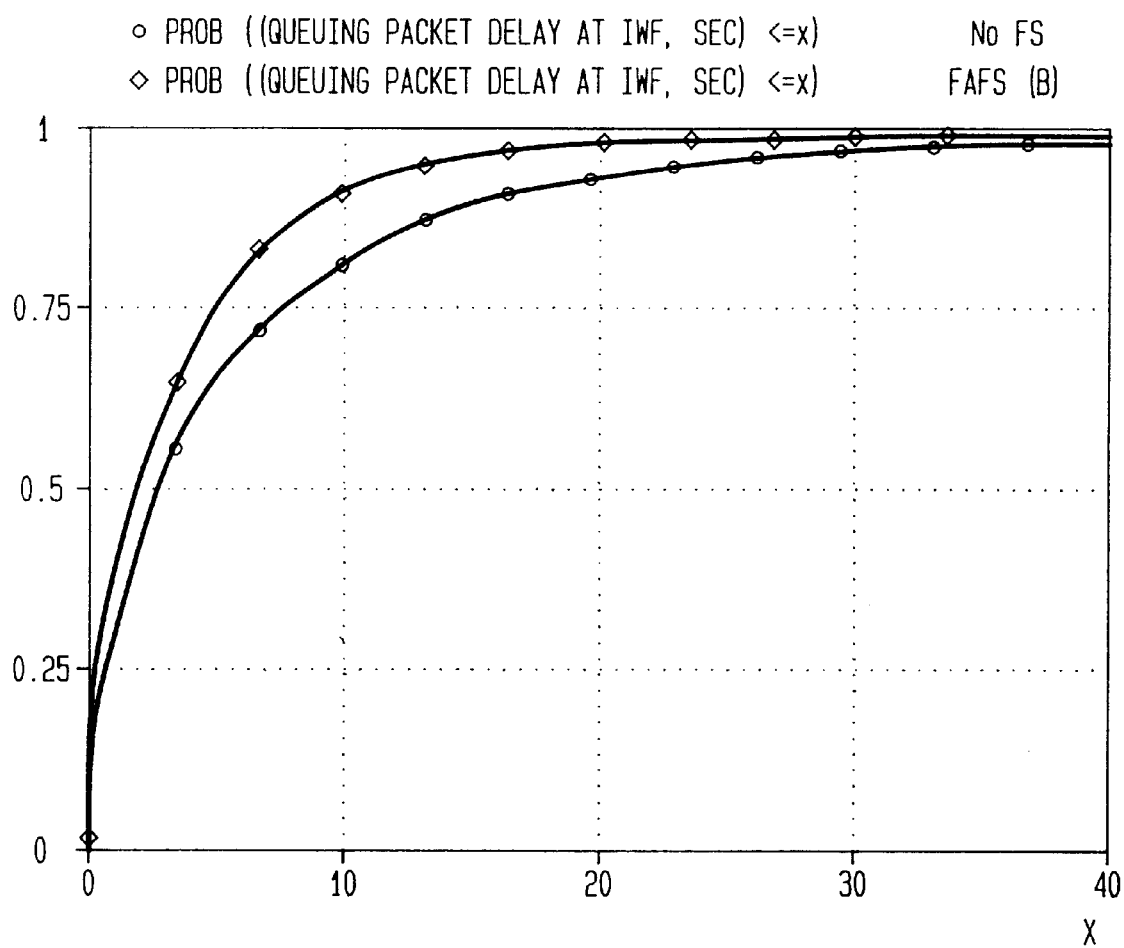

FIG. 13 shows simulation results for the cumulative distribution function (CDF) of the access delay. These curves correspond to the cases when the maximum number of available supplemental channels is equal to three. The AFS scheme not only improves average delay, but also mitigates most of the instances of large per-packet delays. This is obvious from the comparison of distribution tails in FIG. 13.

Figure 14A:
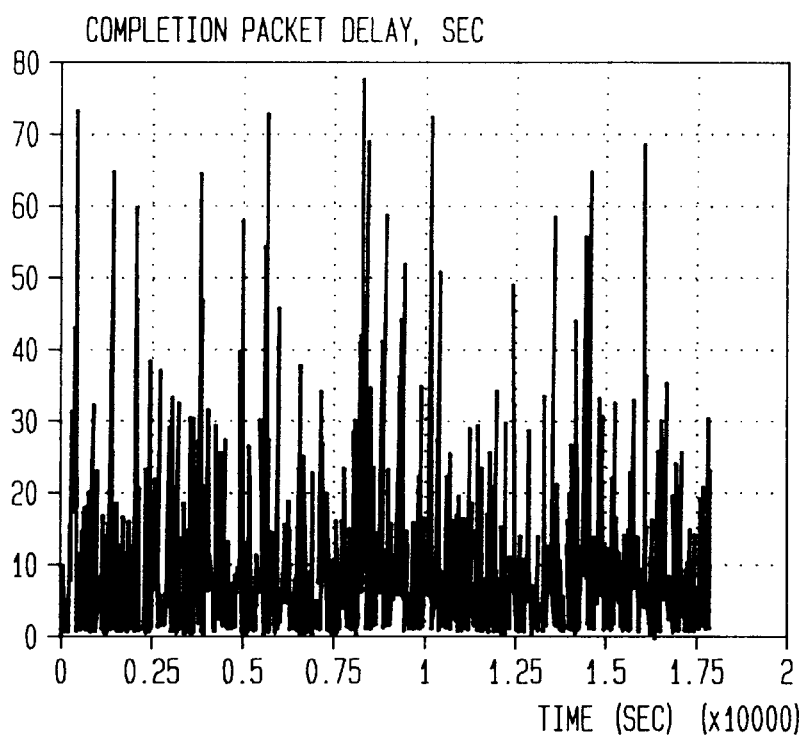
Figure 14B:
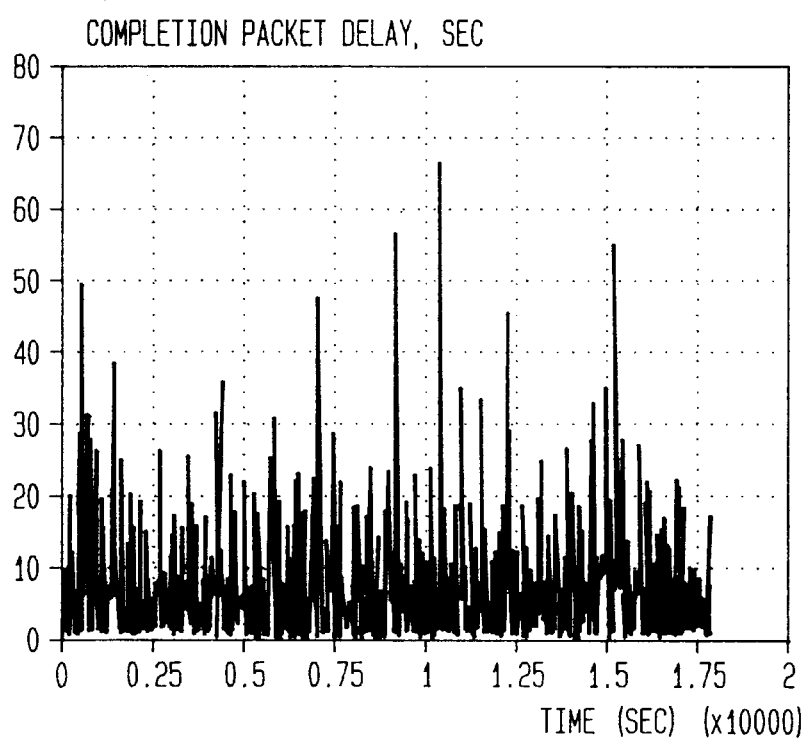
Figure 15A:
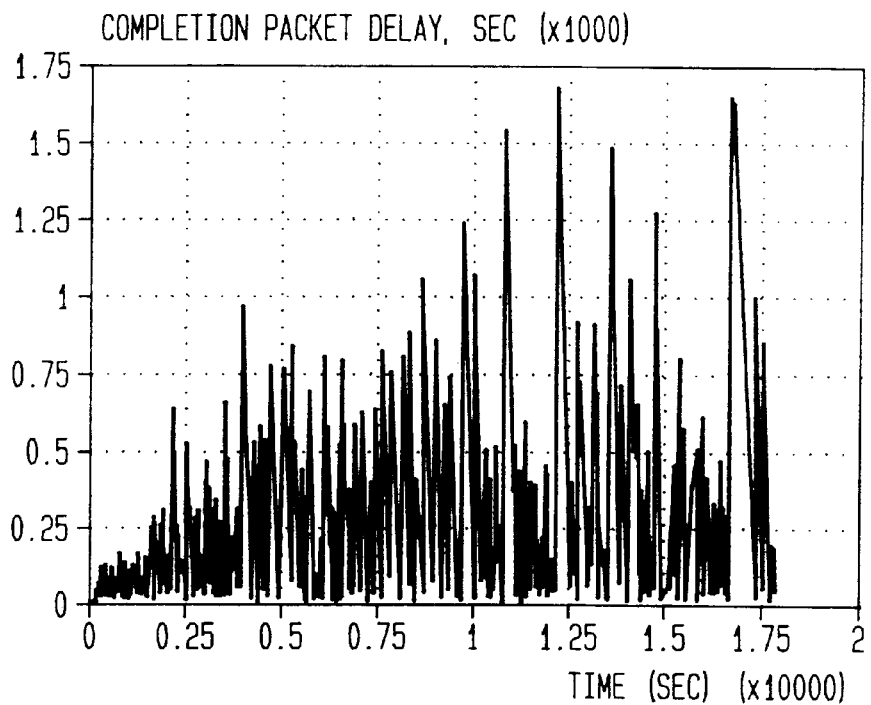
Figure 15B:
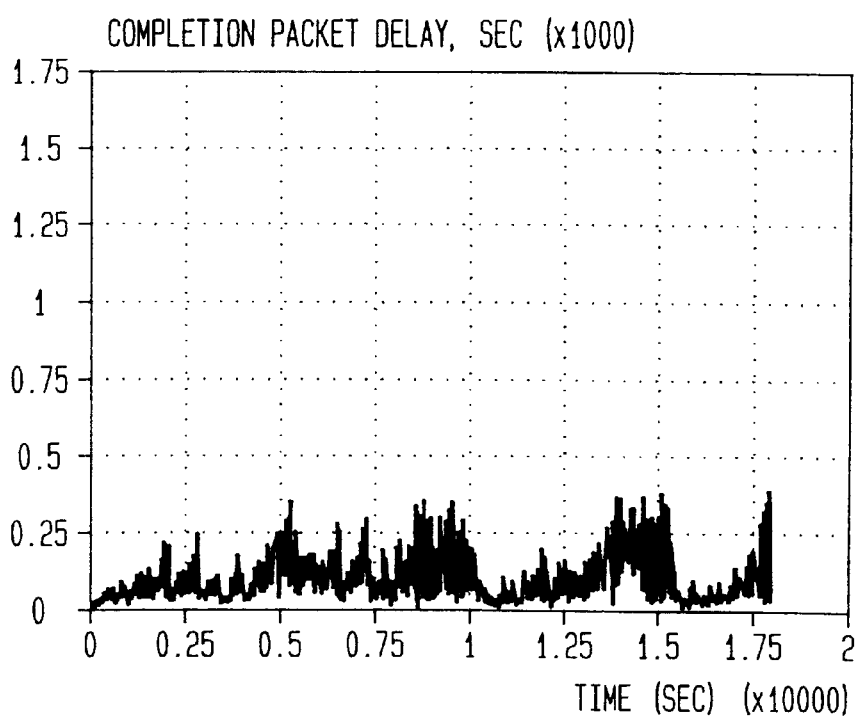

FIGS. 14(A)–(B) show simulation results for time distributions of completion delays for three supplemental channels with no fair-sharing scheme and with the AFS scheme, respectively. FIGS. 15(A)–(B) show simulation results for time distributions of completion delays for two supplemental channels with no fair-sharing scheme and with the AFS scheme, respectively. The AFS distributions are characterized by significantly smaller numbers of congestion events due to the ability of scheme to prevent hogging. This effect is most pronounced under heavy loads, as shown in FIGS. 15(A)–(B).

FIG. 16 shows simulation results for the number of blocking events per packet arrival. Most of the blocking events lead to an additional retry handshake between the node and the BRM. Therefore, application of the AFS scheme may result in savings of more than half of the messages between the IWF or mobile and the cell site, especially if the cell site is under heavy loads so that only two or three supplemental channels are available for high-speed data users.

As shown by these simulation results, the AFS scheme significantly improves high-speed data performance from the perspective of users (smaller delays) and the infrastructure (less messaging between the IWF and the cell site). As expected, this scheme adds most of its value under heavy load conditions (i.e., large number of users and/or small number of supplemental channels that can be allocated). Reducing reverse-link signaling saves valuable RF resources.

Initially, many customers may expect high-speed data service to use RF resources left over from the voice service. Under such circumstances, it is quite realistic to expect that only two or three supplemental channels will be available to five or more data users in the sector for significant periods of time. The simulation results presented above show that, under these conditions, the AFS scheme may reduce the average IP packet delay by approximately 8 minutes (effect of TCP time-out is not considered) and reduce messaging by 55%.

In alternative implementations, where more RF resources are dedicated to high-speed data service, the number of users per carrier per sector may be expected to grow significantly. Therefore, heavy load conditions will occur with the larger number of available supplemental channels. The AFS scheme is expected to provide similar performance improvement under these conditions as well.

Although the present invention has been described in the context of CDMA-based cellular systems conforming to the IS-95B standard, the present invention can also be implemented in the context of other CDMA-based cellular systems conforming to other standards, as well as to cellular systems based on schemes other than CDMA, such as TDMA where channels are defined based on time, FDMA where channels are defined based on frequency, and hybrid schemes involving at least two of CDMA, TDMA, and FDMA.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. At a burst controller of a cellular telecommunication system, a method for assigning additional bandwidth in the cellular telecommunication system, comprising the steps of:

(a) receiving, from a remote user or a user proxy, an initial request for assignment of additional bandwidth for the user and determining whether to grant or reject the initial request, such that, if the initial request is rejected, instructions are transmitted from the burst controller to the user or the user proxy to submit a retry request after a specified back-off time; and (b) receiving, from the user or the user proxy, a retry request for assignment of additional bandwidth for the user after a previous request was rejected and determining whether to grant or reject the retry request, such that, if the retry request is rejected, instructions are transmitted from the burst controller to the user or the user proxy to submit a retry request after a specified back-off time.

2. The invention of claim 1, further comprising the step of receiving, from the user or the user proxy, a continuation request for reassignment of additional bandwidth for the user for an on-going burst and determining whether to grant or reject the continuation request, such that, if the continuation request is rejected, instructions are transmitted from the burst controller to the user or the user proxy to submit a retry request after a specified back-off time.

3. The invention of claim 2, wherein a continuation request is rejected if the number of continuations for a corresponding on-going burst exceeds a threshold value.

4. The invention of claim 2, wherein back-off times for continuation requests are a function of the number of recently rejected requests.

5. The invention of claim 4, wherein:

back-off times $T_{RETRY}$ for rejected continuation requests are given by:

$$T_{RETRY}=\text{Random}[2^{(N-1)}T_{RETRY\_SMALL}, 2^{(N-1)}T_{RETRY\_LARGE}];$$

Random is a function that randomly selects a value between two values;

$T_{RETRY\_SMALL}$ is a parameter value;

$T_{RETRY\_LARGE}$ is a parameter value greater than $T_{RETRY\_SMALL}$;

N=Roundup(Block_counter/Backoff_threshold);

Round_up is a function that rounds to a next higher integer;

Block_counter is the number of recently rejected requests; and

Backoff_threshold is a parameter value.

6. The invention of claim 2, wherein granting continuation requests is given priority over granting retry requests.

7. The invention of claim 2, wherein the additional bandwidth is adjusted for reassignments as a function of the number of recently rejected requests.

8. The invention of claim 1, wherein the cellular telecommunication system is a CDMA system.

9. The invention of claim 1, wherein the additional bandwidth can be assigned to each user from only one cell site at a time.

10. The invention of claim 1, wherein the additional bandwidth is used for one of forward-link communications and reverse-link communications.

11. The invention of claim 1, wherein initial requests are handled asynchronously and are satisfied as long as sufficient resources are available.

12. The invention of claim 1, wherein retry requests are handled asynchronously.

13. The invention of claim 1, wherein each granted request is for burst having a duration not exceeding a maximum burst duration.

14. The invention of claim 1, wherein retry requests are handled synchronously at epoch times.

15. The invention of claim 14, wherein bursts granted in response to initial requests expire at the epoch times.

16. The invention of claim 14, wherein back-off times coincide with the epoch times.

17. The invention of claim 14, wherein retry requests are handled at the epoch times.

18. The invention of claim 1, wherein back-off times are a function of the number of recently rejected requests.

19. The invention of claim 18, wherein back-off times are based on a binary exponential back-off function.

20. The invention of claim 18, wherein:

back-off times $T_{RETRY}$ for rejected initial and retry requests are given by:

$$T_{RETRY}=\text{Random}[T_{END}, T_{END}+2^{(N-1)}T_{RETRY\_SMALL}];$$

Random is a function that randomly selects a value between two values;

T$_{END}$ is the next time that an on-going burst is scheduled to end;

T$_{RETRY\_SMALL}$ is a parameter value;

N=Round_up(Block_counter/Backoff_threshold);

Round_up is a function that rounds to a next higher integer;

Block_counter is the number of recently rejected requests; and

Backoff_threshold is a parameter value.

21. The invention of claim 1, wherein retry requests are treated the same as initial requests.

22. The invention of claim 1, further comprising the step of receiving, from the user or the user proxy, a continuation request for reassignment of additional bandwidth for the user for an on-going burst and determining whether to grant or reject the continuation request, such that, if the continuation request is rejected, instructions are transmitted from the burst controller to the user or the user proxy to submit a retry request after a specified back-off time, wherein:

- a continuation request is rejected if the number of continuations for a corresponding on-going burst exceeds a threshold value;
- granting continuation requests is given priority over granting retry requests;
- initial requests are handled asynchronously and are satisfied as long as sufficient resources are available;
- the retry requests and the continuation requests are handled asynchronously at epoch times;
- bursts granted in response to initial requests expire at the epoch times; and
- back-off times coincide with the epoch times.

23. The invention of claim 1, wherein the additional bandwidth is one or more supplemental channels.

24. The invention of claim 1, wherein the additional bandwidth is a channel having a variable bandwidth.

25. The invention of claim 1, wherein back-off times and burst durations are functions of quality of service parameters for the requesting user.

26. A burst controller for a cellular telecommunication system that assigns additional bandwidth by processing an initial request, received from a remote user or a user proxy, for assignment of additional bandwidth for the user and a retry request, received from the user or the user proxy, for assignment of additional bandwidth for the user after a previous request was rejected, wherein:

- if an initial request is rejected, instructions are transmitted from the burst controller to the user or the user proxy to submit a retry request after a specified back-off time; and
- if a retry request is rejected, instructions are transmitted from the burst controller to the user or the user proxy to submit a retry request after a specified back-off time.

27. The invention of claim 26, wherein the apparatus is a cell site of the cellular telecommunication system.

28. The invention of claim 26, wherein the apparatus is a mobile of the cellular telecommunication system.

29. The invention of claim 26, wherein the cellular telecommunication system assigns additional bandwidth by processing a continuation request, received from the user or the user proxy, for reassignment of additional bandwidth for the user for an on-going burst, wherein if a continuation request is rejected, instructions are transmitted from the burst controller to the user or the user proxy to submit a retry request after a specified back-off time.

30. The invention of claim 29, wherein a continuation request is rejected if the number of continuations for a corresponding on-going burst exceeds a threshold.

31. The invention of claim 26, wherein the cellular telecommunication system is a CDMA system.

32. The invention of claim 26, wherein initial requests are handled asynchronously and are satisfied as long as sufficient resources are available.

33. The invention of claim 26, wherein retry requests are handled asynchronously.

34. The invention of claim 26, wherein each granted request is for burst having a duration not exceeding a maximum burst duration.

35. The invention of claim 26, wherein retry requests are handled synchronously at epoch times.

36. The invention of claim 35, wherein:

- bursts granted in response to initial requests expire at the epoch times; and
- back-off times coincide with the epoch times.

37. The invention of claim 26, wherein back-off times are a function of the number of recently rejected requests.

38. The invention of claim 26, wherein:

- the cellular telecommunication system assigns additional bandwidth by processing a continuation request, received from the user or the user proxy, for reassignment of additional bandwidth for the user for an on-going burst, wherein if a continuation request is rejected, instructions are transmitted from the burst controller to the user or the user proxy to submit a retry request after a specified back-off time;
- a continuation request is rejected if the number of continuations for a corresponding ongoing burst exceeds a threshold value;
- granting continuation requests is given priority over granting retry requests;
- initial requests are handled asynchronously and are satisfied as long as sufficient resources are available;
- the retry requests and the continuation requests are handled asynchronously at epoch times;
- bursts granted in response to initial requests expire at the epoch times; and
- back-off times coincide with the epoch times.

39. The invention of claim 26, wherein the additional bandwidth is one of one or more supplemental channels and a channel having a variable bandwidth.

* * * * *